United States Patent
Staniford

(10) Patent No.: US 10,432,650 B2
(45) Date of Patent: Oct. 1, 2019

(54) SYSTEM AND METHOD TO PROTECT A WEBSERVER AGAINST APPLICATION EXPLOITS AND ATTACKS

(71) Applicant: Stuart Staniford, Freeville, NY (US)

(72) Inventor: Stuart Staniford, Freeville, NY (US)

( * ) Notice: Subject to any disclaimer, the term of this patent is extended or adjusted under 35 U.S.C. 154(b) by 358 days.

(21) Appl. No.: 15/474,178

(22) Filed: Mar. 30, 2017

(65) Prior Publication Data

US 2017/0289186 A1     Oct. 5, 2017

Related U.S. Application Data

(60) Provisional application No. 62/316,067, filed on Mar. 31, 2016.

(51) Int. Cl.
   *G06F 12/16* (2006.01)
   *H04L 29/06* (2006.01)

(52) U.S. Cl.
   CPC .................. *H04L 63/1425* (2013.01)

(58) Field of Classification Search
   CPC   H04L 63/1425; H04L 63/1441; H04L 63/145
   USPC .......................................................... 726/24
   See application file for complete search history.

(56) References Cited

U.S. PATENT DOCUMENTS

| | | |
|---|---|---|
| 6,633,835 B1 | 10/2003 | Moran et al. |
| 6,801,940 B1 | 10/2004 | Moran et al. |
| 6,907,525 B2 | 6/2005 | Pazi et al. |
| 6,944,673 B2 | 9/2005 | Malan et al. |
| 7,069,588 B2 | 6/2006 | Call et al. |
| 7,096,498 B2 | 8/2006 | Judge |
| 7,107,619 B2 | 9/2006 | Silverman |
| 7,171,683 B2 | 1/2007 | Pazi et al. |
| 7,213,260 B2 | 5/2007 | Judge |
| 7,225,466 B2 | 5/2007 | Judge |
| 7,234,168 B2 | 6/2007 | Gupta et al. |
| 7,299,277 B1 | 11/2007 | Moran et al. |

(Continued)

OTHER PUBLICATIONS

Arbatov, Evgeniy, "Development of Hybrid Honeynet for Malware Analysis," Bachelor's Thesis, Helsinki Metropolia University of Applied Sciences Degree Programme in Information Technology, Apr. 19, 2010.

(Continued)

*Primary Examiner* — Amare F Tabor
(74) *Attorney, Agent, or Firm* — Ostrolenk Faber LLP

(57) ABSTRACT

A method and a system of protecting a target computer server system from packet data communication exploits are described. Such a method may include: identifying as being anomalous a first data processing request, and in response: (1) directing the first data processing request to a first diagnostic instrumented module that provides virtualization of a target server or request handling interface and determines an anomaly severity of the first data processing request, and (2) transmitting to the sender of the first data processing request a packet data protocol redirect request for accessing the target computer server system or slow walks a response to the sender. A packet data communication exploit suspect may be determined based on processing of the first data processing request by the first diagnostic instrumented module. The first diagnostic instrumented module may be a virtual server or container virtualizing the server.

71 Claims, 9 Drawing Sheets

(56) References Cited

U.S. PATENT DOCUMENTS

| | | |
|---|---|---|
| 7,308,715 B2 | 12/2007 | Gupta et al. |
| 7,313,815 B2 | 12/2007 | Pazi et al. |
| 7,331,060 B1 | 2/2008 | Ricciulli |
| 7,356,596 B2 | 4/2008 | Ramanujan et al. |
| 7,389,537 B1 | 6/2008 | Callon et al. |
| 7,409,714 B2 | 8/2008 | Gupta et al. |
| 7,415,018 B2 | 8/2008 | Jones et al. |
| 7,463,590 B2 | 12/2008 | Mualem et al. |
| 7,478,168 B2 | 1/2009 | Kamiya |
| 7,478,429 B2 | 1/2009 | Lyon |
| 7,508,764 B2 | 3/2009 | Back et al. |
| 7,515,926 B2 | 4/2009 | Bu et al. |
| 7,536,552 B2 | 5/2009 | Touitou et al. |
| 7,568,224 B1 | 7/2009 | Jennings et al. |
| 7,574,740 B1 | 8/2009 | Kennis |
| 7,584,507 B1 | 9/2009 | Nucci |
| 7,590,728 B2 | 9/2009 | Tonnesen |
| 7,594,009 B2 | 9/2009 | Triulzi et al. |
| 7,607,170 B2 | 10/2009 | Chesla |
| 7,624,444 B2 | 11/2009 | Gupta et al. |
| 7,624,447 B1 | 11/2009 | Horowitz et al. |
| 7,653,938 B1 | 1/2010 | Touitou et al. |
| 7,653,942 B2 | 1/2010 | Tamura et al. |
| 7,681,235 B2 | 3/2010 | Chesla et al. |
| 7,693,947 B2 | 4/2010 | Judge et al. |
| 7,694,128 B2 | 4/2010 | Judge et al. |
| 7,707,287 B2 | 4/2010 | Shafir et al. |
| 7,707,305 B2 | 4/2010 | Afek et al. |
| 7,733,891 B2 | 6/2010 | Reynolds et al. |
| 7,738,396 B1 | 6/2010 | Turner et al. |
| 7,823,204 B2 | 10/2010 | Gupta et al. |
| 7,836,496 B2 | 11/2010 | Chesla et al. |
| 7,843,914 B2 | 11/2010 | Havemann et al. |
| 7,869,352 B1 | 1/2011 | Turner et al. |
| 7,921,460 B1 | 4/2011 | Callon et al. |
| 7,933,985 B2 | 4/2011 | Kurapati et al. |
| 7,944,844 B2 | 5/2011 | Ee et al. |
| 7,958,549 B2 | 6/2011 | Nakae et al. |
| 7,979,368 B2 | 7/2011 | Kapoor et al. |
| 7,979,694 B2 | 7/2011 | Touitou et al. |
| 7,984,493 B2 | 7/2011 | Jones |
| 7,987,503 B2 | 7/2011 | Liu |
| 8,000,329 B2 | 8/2011 | Fendick et al. |
| 8,010,469 B2 | 8/2011 | Kapoor et al. |
| 8,019,866 B2 | 9/2011 | Tonnesen |
| 8,031,627 B2 | 10/2011 | Ee et al. |
| 8,042,149 B2 | 10/2011 | Judge |
| 8,042,181 B2 | 10/2011 | Judge |
| 8,060,074 B2 | 11/2011 | Danford et al. |
| 8,060,607 B2 | 11/2011 | Tonnesen |
| 8,065,725 B2 | 11/2011 | Zheng et al. |
| 8,069,481 B2 | 11/2011 | Judge |
| 8,086,836 B2 | 12/2011 | Chong et al. |
| 8,089,895 B1 | 1/2012 | Mackie |
| 8,135,657 B2 | 3/2012 | Kapoor et al. |
| 8,141,148 B2 | 3/2012 | Thomas et al. |
| 8,151,348 B1 | 4/2012 | Day |
| 8,161,540 B2 | 4/2012 | Mantripragada et al. |
| 8,171,553 B2 | 5/2012 | Aziz et al. |
| 8,185,651 B2 | 5/2012 | Moran et al. |
| 8,204,082 B2 | 6/2012 | Jungck et al. |
| 8,219,653 B1 | 7/2012 | Keagy et al. |
| 8,291,499 B2 | 10/2012 | Aziz et al. |
| 8,295,188 B2 | 10/2012 | Elrod |
| 8,302,180 B1 | 10/2012 | Gudov et al. |
| 8,331,369 B2 | 12/2012 | Ee et al. |
| 8,340,633 B1 | 12/2012 | Rege et al. |
| 8,353,003 B2 | 1/2013 | Noehring et al. |
| 8,370,407 B1 | 2/2013 | Devarajan et al. |
| 8,370,937 B2 | 2/2013 | Gal et al. |
| 8,375,435 B2 | 2/2013 | Fried et al. |
| 8,375,444 B2 | 2/2013 | Aziz et al. |
| 8,380,870 B2 | 2/2013 | Smith et al. |
| 8,392,699 B2 | 3/2013 | Jones et al. |
| 8,392,991 B2 | 3/2013 | Ansari et al. |
| 8,396,465 B2 | 3/2013 | Danford et al. |
| 8,402,540 B2 | 3/2013 | Kapoor et al. |
| 8,407,342 B2 | 3/2013 | Kurapati et al. |
| 8,407,785 B2 | 3/2013 | Sidiroglou et al. |
| 8,418,176 B1 | 4/2013 | Keagy et al. |
| 8,423,645 B2 | 4/2013 | Jeffries et al. |
| 8,433,792 B2 | 4/2013 | Kulaga et al. |
| 8,438,241 B2 | 5/2013 | Bar et al. |
| 8,438,639 B2 | 5/2013 | Lee et al. |
| 8,453,144 B1 | 5/2013 | Keagy et al. |
| 8,468,589 B2 | 6/2013 | Krywaniuk |
| 8,468,590 B2 | 6/2013 | Callon et al. |
| 8,484,372 B1 | 7/2013 | Callon |
| 8,510,826 B1 | 8/2013 | Reams, III et al. |
| 8,516,593 B2 | 8/2013 | Aziz |
| 8,532,970 B2 | 9/2013 | White et al. |
| 8,533,305 B1 | 9/2013 | Keagy et al. |
| 8,533,819 B2 | 9/2013 | Hoeflin et al. |
| 8,543,693 B2 | 9/2013 | Tonnesen |
| 8,554,948 B2 | 10/2013 | Van Der Merwe et al. |
| 8,561,187 B1 | 10/2013 | Hegli |
| 8,561,189 B2 | 10/2013 | Goranson et al. |
| 8,566,928 B2 | 10/2013 | Dagon et al. |
| 8,566,936 B2 | 10/2013 | Chesla |
| 8,576,881 B2 | 11/2013 | Jungck et al. |
| 8,578,497 B2 | 11/2013 | Antonakakis et al. |
| 8,582,567 B2 | 11/2013 | Kurapati et al. |
| 8,584,239 B2 | 11/2013 | Aziz et al. |
| 8,601,322 B2 | 12/2013 | Stolfo et al. |
| 8,601,565 B1 | 12/2013 | Sakata et al. |
| 8,611,219 B2 | 12/2013 | Golic |
| 8,626,147 B2 | 1/2014 | Danford et al. |
| 8,627,456 B2 | 1/2014 | McKenzie et al. |
| 8,631,495 B2 | 1/2014 | Judge |
| 8,646,028 B2 | 2/2014 | McKenzie et al. |
| 8,650,565 B2 | 2/2014 | Narasimhan |
| 8,654,668 B2 | 2/2014 | Fendick et al. |
| 8,661,436 B2 | 2/2014 | McKenzie et al. |
| 8,670,316 B2 | 3/2014 | De Lutiis et al. |
| 8,677,489 B2 | 3/2014 | Strebe et al. |
| 8,677,505 B2 | 3/2014 | Redlich et al. |
| 8,687,638 B2 | 4/2014 | Ee et al. |
| 8,689,213 B2 | 4/2014 | Philipson et al. |
| 8,689,333 B2 | 4/2014 | Aziz |
| 8,694,833 B2 | 4/2014 | Keromytis et al. |
| 8,706,914 B2 | 4/2014 | Duchesneau |
| 8,706,915 B2 | 4/2014 | Duchesneau |
| 8,706,921 B2 | 4/2014 | Zadigian et al. |
| 8,726,379 B1 | 5/2014 | Stiansen et al. |
| 8,751,629 B2 | 6/2014 | White et al. |
| 8,762,188 B2 | 6/2014 | Abercrombie et al. |
| 8,769,665 B2 | 7/2014 | Chan et al. |
| 8,773,852 B2 | 7/2014 | Singleton |
| 8,782,783 B2 | 7/2014 | Thomas et al. |
| 8,789,173 B2 | 7/2014 | Narayanaswamy et al. |
| 8,806,009 B2 | 8/2014 | Kulaga et al. |
| 8,811,401 B2 | 8/2014 | Stroud et al. |
| 8,811,970 B2 | 8/2014 | Danford et al. |
| 8,819,808 B2 | 8/2014 | Fried et al. |
| 8,819,821 B2 | 8/2014 | Ansari et al. |
| 8,824,508 B2 | 9/2014 | Stroud et al. |
| 8,848,741 B2 | 9/2014 | Cook et al. |
| 8,856,600 B2 | 10/2014 | Zadigian et al. |
| 8,869,144 B2 | 10/2014 | Pratt et al. |
| 8,881,282 B1 | 11/2014 | Aziz et al. |
| 8,924,571 B2 | 12/2014 | Pratt et al. |
| 8,924,954 B2 | 12/2014 | Wang |
| 8,925,068 B2 | 12/2014 | Yoo |
| 8,935,782 B2 | 1/2015 | Christodorescu et al. |
| 8,949,965 B2 | 2/2015 | Taylor et al. |
| 9,392,007 B2 * | 7/2016 | Giokas ............... H04L 63/1425 |
| 9,467,462 B2 * | 10/2016 | Reyes ............... H04L 63/1425 |
| 9,921,938 B2 * | 3/2018 | Akiyama ............ G06F 21/554 |
| 10,229,231 B2 * | 3/2019 | Nallapa ............... G06F 3/011 |
| 2002/0083175 A1 | 6/2002 | Afek et al. |
| 2002/0166063 A1 | 11/2002 | Lachman et al. |
| 2003/0004688 A1 | 1/2003 | Gupta et al. |
| 2003/0004689 A1 | 1/2003 | Gupta et al. |
| 2003/0009699 A1 | 1/2003 | Gupta et al. |

(56) References Cited

U.S. PATENT DOCUMENTS

| | | |
|---|---|---|
| 2003/0014662 A1 | 1/2003 | Gupta et al. |
| 2003/0037258 A1 | 2/2003 | Koren |
| 2003/0046577 A1 | 3/2003 | Silverman |
| 2003/0046581 A1 | 3/2003 | Call et al. |
| 2003/0070096 A1 | 4/2003 | Pazi et al. |
| 2003/0110274 A1 | 6/2003 | Pazi et al. |
| 2003/0110288 A1 | 6/2003 | Ramanujan et al. |
| 2003/0159070 A1 | 8/2003 | Mayer et al. |
| 2003/0172145 A1 | 9/2003 | Nguyen |
| 2003/0172167 A1 | 9/2003 | Judge et al. |
| 2003/0172292 A1 | 9/2003 | Judge |
| 2003/0172294 A1 | 9/2003 | Judge |
| 2003/0182423 A1 | 9/2003 | Shafir et al. |
| 2003/0188189 A1 | 10/2003 | Desai et al. |
| 2004/0034794 A1 | 2/2004 | Mayer et al. |
| 2004/0054925 A1 | 3/2004 | Etheridge et al. |
| 2004/0059944 A1 | 3/2004 | Stademann |
| 2004/0114519 A1 | 6/2004 | MacIsaac |
| 2004/0117478 A1 | 6/2004 | Triulzi et al. |
| 2004/0229199 A1 | 11/2004 | Ashley et al. |
| 2004/0250124 A1 | 12/2004 | Chesla et al. |
| 2004/0250158 A1 | 12/2004 | Le Pennec et al. |
| 2004/0257999 A1 | 12/2004 | MacIsaac |
| 2005/0018618 A1 | 1/2005 | Mualem et al. |
| 2005/0021999 A1 | 1/2005 | Touitou et al. |
| 2005/0044352 A1 | 2/2005 | Pazi et al. |
| 2005/0058129 A1 | 3/2005 | Jones et al. |
| 2005/0105513 A1 | 5/2005 | Sullivan et al. |
| 2005/0120090 A1 | 6/2005 | Kamiya |
| 2005/0120242 A1 | 6/2005 | Mayer et al. |
| 2005/0125195 A1 | 6/2005 | Brendel |
| 2005/0166049 A1 | 7/2005 | Touitou et al. |
| 2005/0204169 A1 | 9/2005 | Tonnesen |
| 2005/0278779 A1 | 12/2005 | Koppol et al. |
| 2006/0036727 A1 | 2/2006 | Kurapati et al. |
| 2006/0069912 A1 | 3/2006 | Zheng et al. |
| 2006/0074621 A1 | 4/2006 | Rachman |
| 2006/0075084 A1 | 4/2006 | Lyon |
| 2006/0075480 A1 | 4/2006 | Noehring et al. |
| 2006/0075491 A1 | 4/2006 | Lyon |
| 2006/0092861 A1 | 5/2006 | Corday et al. |
| 2006/0107318 A1 | 5/2006 | Jeffries et al. |
| 2006/0117386 A1 | 6/2006 | Gupta et al. |
| 2006/0137009 A1 | 6/2006 | Chesla |
| 2006/0174341 A1 | 8/2006 | Judge |
| 2006/0212572 A1 | 9/2006 | Afek et al. |
| 2006/0229022 A1 | 10/2006 | Bu et al. |
| 2006/0230450 A1 | 10/2006 | Bu et al. |
| 2006/0253447 A1 | 11/2006 | Judge |
| 2006/0265747 A1 | 11/2006 | Judge |
| 2006/0267802 A1 | 11/2006 | Judge et al. |
| 2006/0272018 A1 | 11/2006 | Fouant |
| 2007/0022474 A1 | 1/2007 | Rowett et al. |
| 2007/0022479 A1 | 1/2007 | Sikdar et al. |
| 2007/0033645 A1 | 2/2007 | Jones |
| 2007/0038755 A1 | 2/2007 | Sullivan et al. |
| 2007/0076853 A1 | 4/2007 | Kurapati et al. |
| 2007/0121596 A1 | 5/2007 | Kurapati et al. |
| 2007/0124801 A1 | 5/2007 | Thomas et al. |
| 2007/0130619 A1 | 6/2007 | Reams |
| 2007/0180522 A1 | 8/2007 | Bagnall |
| 2007/0192863 A1 | 8/2007 | Kapoor et al. |
| 2007/0192867 A1 | 8/2007 | Miliefsky |
| 2007/0234414 A1 | 10/2007 | Liu |
| 2007/0250930 A1 | 10/2007 | Aziz et al. |
| 2007/0291739 A1 | 12/2007 | Sullivan et al. |
| 2007/0294676 A1 | 12/2007 | Mellor et al. |
| 2007/0300286 A1 | 12/2007 | Judge |
| 2007/0300298 A1 | 12/2007 | Goranson et al. |
| 2008/0005782 A1 | 1/2008 | Aziz |
| 2008/0047016 A1 | 2/2008 | Spoonamore |
| 2008/0052774 A1 | 2/2008 | Chesla et al. |
| 2008/0077995 A1 | 3/2008 | Curnyn |
| 2008/0126785 A1 | 5/2008 | Chong et al. |
| 2008/0133517 A1 | 6/2008 | Kapoor et al. |
| 2008/0133518 A1 | 6/2008 | Kapoor et al. |
| 2008/0134330 A1 | 6/2008 | Kapoor et al. |
| 2008/0162390 A1 | 7/2008 | Kapoor et al. |
| 2008/0201413 A1 | 8/2008 | Sullivan et al. |
| 2008/0222734 A1 | 9/2008 | Redlich et al. |
| 2008/0229415 A1 | 9/2008 | Kapoor et al. |
| 2008/0240128 A1 | 10/2008 | Elrod |
| 2008/0262990 A1 | 10/2008 | Kapoor et al. |
| 2008/0262991 A1 | 10/2008 | Kapoor et al. |
| 2008/0263661 A1 | 10/2008 | Bouzida |
| 2008/0295175 A1 | 11/2008 | Ansari et al. |
| 2008/0313704 A1 | 12/2008 | Sivaprasad et al. |
| 2008/0320295 A1 | 12/2008 | Chong et al. |
| 2009/0003225 A1 | 1/2009 | Klassen et al. |
| 2009/0003349 A1 | 1/2009 | Havemann et al. |
| 2009/0003364 A1 | 1/2009 | Fendick et al. |
| 2009/0003375 A1 | 1/2009 | Havemann et al. |
| 2009/0007266 A1 | 1/2009 | Wu et al. |
| 2009/0013404 A1 | 1/2009 | Chow et al. |
| 2009/0028135 A1 | 1/2009 | Mantripragada et al. |
| 2009/0036111 A1 | 2/2009 | Danford et al. |
| 2009/0037592 A1 | 2/2009 | Lyon |
| 2009/0077632 A1 | 3/2009 | Carpenter et al. |
| 2009/0113535 A1 | 4/2009 | Taylor et al. |
| 2009/0144806 A1 | 6/2009 | Gal et al. |
| 2009/0191608 A1 | 7/2009 | Matsumoto |
| 2009/0216910 A1 | 8/2009 | Duchesneau |
| 2009/0262741 A1 | 10/2009 | Jungck et al. |
| 2009/0281864 A1 | 11/2009 | Abercrombie et al. |
| 2009/0300177 A1 | 12/2009 | Tonnesen |
| 2009/0319247 A1 | 12/2009 | Ratcliffe et al. |
| 2009/0319248 A1 | 12/2009 | White et al. |
| 2009/0319249 A1 | 12/2009 | White et al. |
| 2009/0319647 A1 | 12/2009 | White et al. |
| 2009/0319906 A1 | 12/2009 | White et al. |
| 2009/0320137 A1 | 12/2009 | White et al. |
| 2010/0091676 A1 | 4/2010 | Moran et al. |
| 2010/0103837 A1 | 4/2010 | Jungck et al. |
| 2010/0154057 A1 | 6/2010 | Ko et al. |
| 2010/0162350 A1 | 6/2010 | Jeong et al. |
| 2010/0165862 A1 | 7/2010 | Nylander et al. |
| 2010/0191850 A1 | 7/2010 | Tonnesen |
| 2010/0199345 A1 | 8/2010 | Nadir |
| 2010/0205014 A1 | 8/2010 | Sholer et al. |
| 2010/0212005 A1 | 8/2010 | Eswaran et al. |
| 2010/0226369 A9 | 9/2010 | Havemann et al. |
| 2010/0251370 A1 | 9/2010 | Sun et al. |
| 2011/0019547 A1 | 1/2011 | De Lutiis et al. |
| 2011/0035469 A1 | 2/2011 | Smith et al. |
| 2011/0066716 A1 | 3/2011 | Sullivan et al. |
| 2011/0066724 A1 | 3/2011 | Sullivan et al. |
| 2011/0071997 A1 | 3/2011 | Sullivan et al. |
| 2011/0078782 A1 | 3/2011 | Chan et al. |
| 2011/0099622 A1 | 4/2011 | Lee et al. |
| 2011/0107412 A1 | 5/2011 | Lee et al. |
| 2011/0126196 A1 | 5/2011 | Cheung et al. |
| 2011/0131406 A1 | 6/2011 | Jones et al. |
| 2011/0141124 A1 | 6/2011 | Halls et al. |
| 2011/0145418 A1 | 6/2011 | Pratt et al. |
| 2011/0145458 A1 | 6/2011 | Narasimhan |
| 2011/0145819 A1 | 6/2011 | McKenzie et al. |
| 2011/0145820 A1 | 6/2011 | Pratt et al. |
| 2011/0145821 A1 | 6/2011 | Philipson et al. |
| 2011/0145886 A1 | 6/2011 | McKenzie et al. |
| 2011/0145916 A1 | 6/2011 | McKenzie et al. |
| 2011/0173697 A1 | 7/2011 | Kurapati et al. |
| 2011/0197274 A1 | 8/2011 | Callon et al. |
| 2011/0213869 A1 | 9/2011 | Korsunsky et al. |
| 2011/0214157 A1 | 9/2011 | Korsunsky et al. |
| 2011/0219035 A1 | 9/2011 | Korsunsky et al. |
| 2011/0219445 A1 | 9/2011 | Van Der Merwe et al. |
| 2011/0231510 A1 | 9/2011 | Korsunsky et al. |
| 2011/0231564 A1 | 9/2011 | Korsunsky et al. |
| 2011/0238855 A1 | 9/2011 | Korsunsky et al. |
| 2011/0299419 A1 | 12/2011 | Fendick et al. |
| 2012/0005287 A1 | 1/2012 | Gadel et al. |
| 2012/0015644 A1 | 1/2012 | Danford et al. |
| 2012/0017262 A1 | 1/2012 | Kapoor et al. |
| 2012/0084858 A1 | 4/2012 | Tonnesen |

(56) References Cited

U.S. PATENT DOCUMENTS

| | | |
|---|---|---|
| 2012/0129517 A1 | 5/2012 | Fox et al. |
| 2012/0131591 A1 | 5/2012 | Moorthi et al. |
| 2012/0159623 A1 | 6/2012 | Choi |
| 2012/0173609 A1 | 7/2012 | Kulaga et al. |
| 2012/0174186 A1 | 7/2012 | Aziz et al. |
| 2012/0179916 A1 | 7/2012 | Staker et al. |
| 2012/0204261 A1 | 8/2012 | Mantripragada et al. |
| 2012/0204264 A1 | 8/2012 | Jiang |
| 2012/0204265 A1 | 8/2012 | Judge |
| 2012/0216282 A1 | 8/2012 | Pappu et al. |
| 2012/0218901 A1 | 8/2012 | Jungck et al. |
| 2012/0227088 A1 | 9/2012 | Gao |
| 2012/0232679 A1 | 9/2012 | Abercrombie et al. |
| 2012/0240185 A1 | 9/2012 | Kapoor et al. |
| 2012/0272206 A1 | 10/2012 | Sengupta et al. |
| 2012/0284516 A1 | 11/2012 | Errico |
| 2012/0324572 A1 | 12/2012 | Gordon et al. |
| 2012/0331553 A1 | 12/2012 | Aziz et al. |
| 2013/0007870 A1 | 1/2013 | Devarajan et al. |
| 2013/0007882 A1 | 1/2013 | Devarajan et al. |
| 2013/0036472 A1 | 2/2013 | Aziz |
| 2013/0047257 A1 | 2/2013 | Aziz |
| 2013/0054816 A1 | 2/2013 | Gurbani et al. |
| 2013/0055388 A1 | 2/2013 | Thomas et al. |
| 2013/0085914 A1 | 4/2013 | McPherson et al. |
| 2013/0124712 A1 | 5/2013 | Parker |
| 2013/0132942 A1 | 5/2013 | Wang |
| 2013/0133072 A1 | 5/2013 | Kraitsman et al. |
| 2013/0139214 A1 | 5/2013 | Chesla |
| 2013/0143522 A1 | 6/2013 | Rege et al. |
| 2013/0145464 A1 | 6/2013 | Lyon |
| 2013/0152187 A1 | 6/2013 | Strebe et al. |
| 2013/0185056 A1 | 7/2013 | Ingram et al. |
| 2013/0198065 A1 | 8/2013 | McPherson et al. |
| 2013/0198805 A1 | 8/2013 | Strebe |
| 2013/0212679 A1 | 8/2013 | Ansari et al. |
| 2013/0215754 A1 | 8/2013 | Tripathi et al. |
| 2013/0217378 A1 | 8/2013 | Danford et al. |
| 2013/0219495 A1 | 8/2013 | Kulaga et al. |
| 2013/0219502 A1 | 8/2013 | Danford et al. |
| 2013/0223438 A1 | 8/2013 | Tripathi et al. |
| 2013/0235870 A1 | 9/2013 | Tripathi et al. |
| 2013/0238885 A1 | 9/2013 | Tripathi et al. |
| 2013/0242983 A1 | 9/2013 | Tripathi et al. |
| 2013/0263247 A1 | 10/2013 | Jungck et al. |
| 2013/0276090 A1 | 10/2013 | Kopti |
| 2013/0291107 A1 | 10/2013 | Marck et al. |
| 2013/0298184 A1 | 11/2013 | Ermagan et al. |
| 2013/0306276 A1 | 11/2013 | Duchesneau |
| 2013/0325873 A1 | 12/2013 | Sitsky et al. |
| 2013/0340977 A1 | 12/2013 | Singleton |
| 2013/0342989 A1 | 12/2013 | Singleton |
| 2013/0342993 A1 | 12/2013 | Singleton |
| 2013/0343181 A1 | 12/2013 | Stroud et al. |
| 2013/0343207 A1 | 12/2013 | Cook et al. |
| 2013/0343377 A1 | 12/2013 | Stroud et al. |
| 2013/0343378 A1 | 12/2013 | Veteikis et al. |
| 2013/0343379 A1 | 12/2013 | Stroud et al. |
| 2013/0343380 A1 | 12/2013 | Canion et al. |
| 2013/0343387 A1 | 12/2013 | Stroud et al. |
| 2013/0343388 A1 | 12/2013 | Stroud et al. |
| 2013/0343389 A1 | 12/2013 | Stroud et al. |
| 2013/0343390 A1 | 12/2013 | Moriarty et al. |
| 2013/0343407 A1 | 12/2013 | Stroud et al. |
| 2013/0343408 A1 | 12/2013 | Cook et al. |
| 2013/0346415 A1 | 12/2013 | Tomlinson et al. |
| 2013/0346628 A1 | 12/2013 | Canion et al. |
| 2013/0346637 A1 | 12/2013 | Zadigian et al. |
| 2013/0346639 A1 | 12/2013 | Stroud |
| 2013/0346667 A1 | 12/2013 | Stroud et al. |
| 2013/0346700 A1 | 12/2013 | Tomlinson et al. |
| 2013/0346719 A1 | 12/2013 | Tomlinson et al. |
| 2013/0346736 A1 | 12/2013 | Cook et al. |
| 2013/0346756 A1 | 12/2013 | Cook et al. |
| 2013/0346814 A1 | 12/2013 | Zadigian et al. |
| 2013/0346987 A1 | 12/2013 | Raney et al. |
| 2013/0347103 A1 | 12/2013 | Veteikis et al. |
| 2013/0347116 A1 | 12/2013 | Flores et al. |
| 2014/0026215 A1 | 1/2014 | Tonnesen |
| 2014/0033310 A1 | 1/2014 | Cheng |
| 2014/0046644 A1 | 2/2014 | White et al. |
| 2014/0046645 A1 | 2/2014 | White et al. |
| 2014/0059641 A1 | 2/2014 | Chapman et al. |
| 2014/0081984 A1 | 3/2014 | Sitsky et al. |
| 2014/0087712 A1 | 3/2014 | Danford et al. |
| 2014/0089506 A1 | 3/2014 | Puttaswamy Naga et al. |
| 2014/0098662 A1 | 4/2014 | Jungck et al. |
| 2014/0101754 A1 | 4/2014 | McKenzie et al. |
| 2014/0109091 A1 | 4/2014 | Philipson et al. |
| 2014/0109180 A1 | 4/2014 | McKenzie et al. |
| 2014/0150100 A1 | 5/2014 | Gupta et al. |
| 2014/0157370 A1 | 6/2014 | Plattner et al. |
| 2014/0157405 A1 | 6/2014 | Joll et al. |
| 2014/0173731 A1 | 6/2014 | Mantripragada et al. |
| 2014/0181968 A1 | 6/2014 | Ge et al. |
| 2014/0207798 A1 | 7/2014 | Salusky et al. |
| 2014/0215621 A1 | 7/2014 | Xaypanya et al. |
| 2014/0223560 A1 | 8/2014 | Christodorescu et al. |
| 2014/0269728 A1 | 9/2014 | Jalan et al. |
| 2014/0282586 A1 | 9/2014 | Shear et al. |
| 2014/0282887 A1 | 9/2014 | Kaminsky |
| 2014/0289840 A1 | 9/2014 | Jain et al. |
| 2016/0254944 A1* | 9/2016 | Larsson ............... H04L 63/1425 370/230 |
| 2017/0295196 A1* | 10/2017 | Arnell ..................... H04L 69/40 |

OTHER PUBLICATIONS

Krister, Kris Mikael, "Automated Analyses of Malicious Code," Norwegian University of Science and Technology, Master's Thesis, Jun. 2009.

Wimmer Martin, "Virtual security," In 1st Conference on Computer Security Incident Handling, vol. 20 (2008).

Crandall, Jedidiah Richard, "Capturing and analyzing Internet worms," PhD diss., University of California, Davis (2007).

Slowinska, Asia et al., "Prospector: a protocol-specific detector of polymorphic buffer overflows. Technical Report IR< CS< 023," [note: superceded by TR IR< CS< 031],Vrige Universiteit Amsterdam (2006).

Al-Saleh, Mohammed I., "Fine-grained reasoning about the security and usability trade-off in modern security tools," Electronic Thesis and Dissertations, University of New Mexico, Jul. 1, 2011.

Willems, Christian, et al., "Security in Tele-Lab-Protecting an online virtual lab for security training," In Internet Technology and Secured Transactions (2009), ICITST (2009), International Conference for, pp. 1-7, IEEE (2009).

Hawes, John, "Happy Holidays: Mobile Maliciousness," iSIGHT Partners USA, Nov. 1, 2009.

Willems, Christian et al., "Protecting Tele-Lab-attack vectors and countermeasures for a remote virtual IT security lab," International Journal of Digital Society 1, No. 2, pp. 113-122 (2010).

Donatelli, Susanna et al., "Experimental validation of architectural solutions," Departamento de Informática Faculdade de Ciências da Universidade de Lisboa Campo Grande, Lisbon, Portugal, Mar. 2009.

Schiffman, Joshua Serratelli, "Practical system integrity verification in cloud computing environments," PhD diss., The Pennsylvania State University (2012).

Truhan, Nathan D., "Intrusion Detection for 0-Day Vulnerabilities," PhD diss., Kent State University (2011).

Franceschinis, Giuliana, et al., "Experimental validation of architectural solutions," Departamento de Informática Faculdade de Ciências da Universidade de Lisboa Campo Grande, Lisbon, Portugal, Mar. 2009.

Bianchi, Antonio, "Blacksheep: a tool for kernel rootkit detection, based on physical memory crowdsourced analysis," PhD diss., Politecnico di Milano (2012).

Aliari Zonouz Saman, "Game-theoretic intrusion response and recovery," PhD diss., University of Illinois at Urbana-Champaign (2012).

(56) References Cited

OTHER PUBLICATIONS

Locasto, Michael E., "Integrity Postures for Software Self-Defense," PhD diss., Columbia University (2008).
Rossow, Christian, "Using Malware Analysis to Evaluate Botnet Resilience," PhD diss., Phd Thesis (2013).
Bellovin, Steven M. et al., "Link-Cutting Attacks," AT&T Labs Research, New Jersey, Aug. 7, 2003.
Dittrich, Dave, "Pacific North West Honeynet Project," The Information School, University of Washington, DIMACS Large Scale Attack Workshop, Sep. 23, 2003.
Gao, Lixin,"Modeling/Detecting the Spread of Active Worms," Dept. of Electrical & Computer Engineering, University of Massachusetts, Sep. 23-24, 2003.
Ioannidis, John, "DDoS for Zombies," AT&T Labs—Research (2003).
Keromytis, Angelos, "Countering DDoS Without Changing the Internet," Columbia University (2003).
Moore, David, "Network Telescopes," DIMACS Large-scale Internet Attacks Workshop, Sep. 23, 2003.
Staniford, Stuart, "Worm Overview," Silicon Defense (2003).
Boyd, John, "Wormholes and a Honeyfarm: Automatically Detecting Novel Worms (and other random stuff)," (2003).
Bhuyan, Monowar H., et al. "Detecting distributed denial service attacks: methods, tools and future directions." The Computer Journal (2013):bxt031.

\* cited by examiner

SYSTEM AND METHOD TO PROTECT A WEBSERVER AGAINST APPLICATION EXPLOITS AND ATTACKS

CROSS-REFERENCE TO RELATED APPLICATIONS

The present non-provisional patent application claims the benefit of priority from U.S. Provisional Patent Application No. 62/316,067, filed Mar. 31, 2016, the entire contents of each of which are incorporated herein by reference.

FIELD OF THE INVENTION

The present disclosure relates to the field of malware and application exploit defense technology, and in particular to technology to protect a server computer against malicious and risky communications.

BACKGROUND OF THE DISCLOSURE

Defenses against various types of malware attacks and application exploits have been developed to protect servers and client computers against malicious attacks over data networks, such as the Internet. Such attacks can result and have resulted in major financial losses to large and small companies as well as to individuals.

Servers can attack browsers, and browsers can attack servers. In turn, malware may be directed against a browser from a server that has been compromised by malware. Scanning worms can generate attacks against servers. Web servers are attacked for a variety of reasons. For example, hackers can attempt to steal information, e.g., the customer list of a company; hackers can attempt to deface a server, such as the server of a prominent bank to make a political or other statement or to further a political or other agenda, hackers can attempt to hack into a server to use the server as an intermediate hop or node to gain access inside a corporate network, to use the server as a zombie in a DDoS attack, to use the server in a subsequent attack against a client computer that accesses the server, and the like. For example, a foreign state has been accused of being behind the Zero Day attack against a website of the Counsel of Foreign Relations, whose ultimate target were clients who visited the website.

For example, one common type of attack against a server is an SQL injection attack, in which a malicious command is injected into a field where the server does not expect such a command. By way of illustration, a semicolon, or other string escape character, can be added by a user in a field of an on-line form in which the server does not expect to receive a semicolon. The text following the semicolon can then be treated by the server as one or more commands that destroy data, provide access to data, or cause other processing by the server that is considered malicious. Also, the text entered in the field may be incorrectly handled by the server for other reasons. Further, the malicious command may not be executed immediately by the server and may be stored as valid SQL, and later another part of the application or a second application may execute the stored statement ("second order SQL attack").

Some existing and known defenses against malware include an anomaly detector to decide whether data received by a server is of a type that the server expects to receive. Some vendors run suspect information received by a server or by a client computer on an offsite virtual machine farm, and thus can monitor execution of the communications received to determine the presence of malicious software.

Each related patent document, patent application publication, and reference on the following list is incorporated in full herein by reference:
U.S. Pat. No. 8,949,965, Securely virtualizating network services; U.S. Pat. No. 8,935,782, Malware detection via network information flow theories; U.S. Pat. No. 8,924,954, Application software installation method and application software installation apparatus; U.S. Pat. No. 8,924,571, Methods and systems for providing to virtual machines, via a designated wireless local area network driver, access to data associated with a connection to a wireless local area network; U.S. Pat. No. 8,881,282, Systems and methods for malware attack detection and identification; U.S. Pat. No. 8,869,144, Managing forwarding of input events in a virtualization environment to prevent keylogging attacks; U.S. Pat. No. 8,811,970; Virtual instance architecture for mobile device management systems; U.S. Pat. No. 8,751,629, Systems and methods for automated building of a simulated network environment; U.S. Pat. No. 8,689,333, Malware defense system and method; U.S. Pat. No. 8,689,213, Methods and systems for communicating between trusted and non-trusted virtual machines; U.S. Pat. No. 8,661,436. Dynamically controlling virtual machine access to optical disc drive by selective locking to a transacting virtual machine determined from a transaction stream of the drive; U.S. Pat. No. 8,650,565, Servicing interrupts generated responsive to actuation of hardware, via dynamic incorporation of ACPI functionality into virtual firmware; U.S. Pat. No. 8,646,028; Methods and systems for allocating a USB device to a trusted virtual machine or a non-trusted virtual machine; U.S. Pat. No. 8,627,456, Methods and systems for preventing access to display graphics generated by a trusted virtual machine; U.S. Pat. No. 8,626,147, Virtual instance architecture for mobile device management systems; U.S. Pat. No. 8,584,239, Virtual machine with dynamic data flow analysis; U.S. Pat. No. 8,578,497, Method and system for detecting malware; U.S. Pat. No. 8,566,928, Method and system for detecting and responding to attacking networks; U.S. Pat. No. 8,533,305, System and method for adapting a system configuration of a first computer system for hosting on a second computer system; U.S. Pat. No. 8,532,970, Systems and methods for network monitoring and analysis of a simulated network; U.S. Pat. No. 8,516,593, Systems and methods for computer worm defense; U.S. Pat. No. 8,453,144, System and method for adapting a system configuration using an adaptive library; U.S. Pat. No. 8,418,176, System and method for adapting virtual machine configurations for hosting across different hosting systems; U.S. Pat. No. 8,396,465, Virtual instance architecture for mobile device management systems; U.S. Pat. No. 8,375,444, Dynamic signature creation and enforcement; U.S. Pat. No. 8,340,633, Mobile activity intelligence; U.S. Pat. No. 8,291,499, Policy based capture with replay to virtual machine; U.S. Pat. No. 8,219,653, System and method for adapting a system configuration of a first computer system for hosting on a second computer system; U.S. Pat. No. 8,171,553, Heuristic based capture with replay to virtual machine; U.S. Pat. No. 8,086,836, Method and apparatus for virtualization of appliances; U.S. Pat. No. 8,060,074, Virtual instance architecture for mobile device management systems; 20140282586, Purposeful computing; 20140223560, Malware detection via network information flow theories; 20140109180, Methods and systems for preventing access to display graphics generated by a trusted virtual machine; 20140109091, Device virtualization; 20140101754, Methods and systems for allocating a usb device to a trusted virtual machine or a non-trusted virtual machine;

20140087712, Virtual instance architecture for mobile device management systems; 20140081984, Systems and methods for scalable delocalized information governance; 20140046645, Systems and methods for network monitoring and analysis of a simulated network; 20140046644, Systems and methods for network monitoring and analysis of a simulated network; 20130325873, Systems and methods for load balancing by secondary processors in parallelized indexing; 20130217378, Virtual instance architecture for mobile device management systems; 20130143522, Mobile activity intelligence; 20130132942, Application software installation method and application software installation apparatus; 20130047257, Systems and Methods for Computer Worm Defense; 20130036472, Computer Worm Defense System and Method; 20120331553, Dynamic signature creation and enforcement; 20120179916, Systems and methods for securing virtual machine computing environments; 20120174186, Policy Based Capture with Replay to Virtual Machine; 20120131591, Method and apparatus for clearing cloud compute demand; 20120015644, Virtual Instance Architecture for Mobile Device Management Systems; 20110145916, Methods and systems for preventing access to display graphics generated by a trusted virtual machine; 20110145886, Methods and systems for allocating a usb device to a trusted virtual machine or a non-trusted virtual machine; 20110145821, Methods and systems for communicating between trusted and non-trusted virtual machines; 20110145820, Methods and systems for managing injection of input data into a virtualization environment; 20110145819, Methods and systems for controlling virtual machine access to an optical disk drive; 20110145458, Methods and systems for servicing interrupts generated responsive to actuation of hardware, via virtual firmware; 20110145418, Methods and systems for providing to virtual machines, via a designated wireless local area network driver, access to data associated with a connection to a wireless local area network; 20110141124, Methods and systems for securing sensitive information using a hypervisor-trusted client; 20090320137, Systems and methods for a simulated network attack generator; 20090319906, Systems and methods for reconstitution of network elements in a simulated network; 20090319647, Systems and methods for automated building of a simulated network environment; 20090319249, Systems and methods for network monitoring and analysis of a simulated network; 20090319248, Systems and methods for a simulated network traffic generator; 20090319247, Systems and Methods for A Simulated Network Environment and Operation Thereof; 20090113535, Securely Virtualizing Network Services; 20090036111, Virtual Instance Architecture for Mobile Device Management Systems; 20080320295, Method and apparatus for virtualization of appliances; 20080126785, Method and apparatus for virtualization of appliances; 20080005782, Heuristic based capture with replay to virtual machine; 20070294676, Open virtual appliance; 20070250930, Virtual machine with dynamic data flow analysis; Arbatov, Evgeniy. "Development of Hybrid Honeynet for Malware Analysis." (2010); Krister, Kris Mikael. "Automated Analyses of Malicious Code." (2009); Wimmer, Martin. "Virtual security." In 1st Conference on Computer Security Incident Handling, vol. 20. 2008; Crandall, Jedidiah Richard. "Capturing and analyzing Internet worms." PhD diss., University of California, Davis, 2007; Slowinska, Asia, Georgios Portokalidis, and Herbert Bos. Prospector: a protocol-specific detector of polymorphic buffer overflows. Technical Report IR<CS<023 [note: superceded by TR IR<CS<031]Vrige Universiteit Amsterdam, 2006; Al-Saleh, Mohammed I. "Fine-grained reasoning about the security and usability trade-off in modern security tools." (2011); Willems, Christian, Wesam Dawoud, Thomas Klingbeil, and Christoph Meinel. "Security in Tele-Lab—Protecting an online virtual lab for security training." In Internet Technology and Secured Transactions, 2009. ICITST 2009. International Conference for, pp. 1-7. IEEE, 2009; Director, Test Team, John Hawes, Anti-Spam Test Director, Martijn Grooten, Sales Executive, and Allison Sketchley. "Happy Holidays: Mobile Maliciousness." (2009); Willems, Christian, Wesam Dawoud, Thomas Klingbeil, and Christoph Meinel. "Protecting Tele-Lab—attack vectors and countermeasures for a remote virtual IT security lab." International Journal of Digital Society 1, no. 2 (2010): 113-122; Donatelli, Susanna, Eric Alata, Joao Antunes, Mohamed Kaâniche, Nuno Ferreira Neves, and Paulo Verissimo. "Experimental validation of architectural solutions." (2008); Schiffman, Joshua Serratelli. "Practical system integrity verification in cloud computing environments." PhD diss., The Pennsylvania State University, 2012; Truhan, Nathan D. "Intrusion Detection for 0-Day Vulnerabilities." PhD diss., Kent State University, 2011; Franceschinis, Giuliana, Eric Alata, Joao Antunes, Hakem Beitollah, Alysson Neves Bessani, Miguel Correia, Wagner Dantas et al. "Experimental validation of architectural solutions." (2009); Bianchi, Antonio. "Blacksheep: a tool for kernel rootkit detection, based on physical memory crowdsourced analysis." PhD diss., Politecnico di Milano, 2012; Aliari Zonouz, Saman. "Game-theoretic intrusion response and recovery." PhD diss., University of Illinois at Urbana-Champaign, 2012; Locasto, Michael E. "Integrity Postures for Software Self—Defense." PhD diss., Columbia University, 2008; Rossow, Christian. "Using Malware Analysis to Evaluate Botnet Resilience." PhD diss., Phd Thesis, 2013.

SUMMARY OF THE DISCLOSURE

A method and a system of protecting a target computer server system from packet data communication exploits are described, the target computer server system having a request handling interface that responds to a data processing request of a packet data communication. Such a method may include:

receiving over a data communication network a plurality of data processing requests;

identifying as being anomalous, by an automated anomaly analyzer, a first data processing request of the plurality of data processing requests, the first data processing request having been transmitted by a first packet data protocol sending device, wherein in response to the identifying as being anomalous, the automated anomaly analyzer: (1) directs the first data processing request to a first diagnostic instrumented module configured to provide virtualization of the request handling interface in processing the first data processing request and to determine an anomaly severity of the first data processing request, and (2) transmits, to the first packet data protocol remote sending device, a packet data protocol redirect request for accessing the target computer server system; and identifying as being non-anomalous, by the automated anomaly analyzer, a second data processing request of the plurality of data processing requests, wherein in response to the identifying as being non-anomalous, the automated anomaly analyzer transmits the second data processing request to the target computer server system.

Such a method may further include determining a packet data communication exploit suspect, based on processing by the first diagnostic instrumented module, of the first data processing request; and transmitting, in response to the determining, a detection signal indicating the first data processing request as being the packet data communication exploit suspect.

Such a method may further include determining a packet data communication exploit suspect, based on processing by the first diagnostic instrumented module, of the first data processing request; and modifying, in response to the determining, the first data processing request.

In such a method, the first diagnostic instrumented module may be a virtual server virtualizing the request handling interface or a container virtualizing the request handling interface.

In such a method, the first data processing request comprises a request for data to be transmitted to the first packet data protocol remote sending device.

In such a method, the transmitting of the packet data protocol redirect request may be performed without the first data processing request being permitted to reach the target computer server system Such a method, may further include transmitting, when the packet data protocol redirect request is transmitted, a data request to a third-party server for data to be provided to the first remote packet data protocol sending device.

In such a method, the data request may be for data to be included in an iframe.

In such a method, the packet data protocol redirect request may include an exploit-flagged-URL.

In such a method, the automated anomaly analyzer may be a module running on a physical machine, and the first diagnostic instrumented module may run on the same physical machine.

In such a method, the first diagnostic instrumented module may be run on a diagnostic module that includes more than one diagnostic instrumented modules, each diagnostic instrumented module provide virtualization of the request handling interface, such that the method further includes: receiving an indication of a processing load of the diagnostic module; assigning an anomaly severity representation to a third data processing request of the plurality of data processing requests according to an anomaly severity determined for the third data processing request; and determining whether to direct the third data processing request to the diagnostic module, according to the anomaly severity representation, wherein a determination of whether the third data processing request is sent to the diagnostic module or to the target computer server system is made in dependence on at least an anomaly severity and processing load of the diagnostic module.

In such a method, when the processing load of the diagnostic module is determined to exceed a threshold and when the anomaly severity representation indicates a low anomaly severity, then the third data processing request may not be directed to the diagnostic module and is sent to the target computer server system.

In such a method, the diagnostic module may be a server emulator, and each diagnostic instrumented module is a virtual server instance implementing virtualization of the request handling interface, or each diagnostic instrumented module may be a container instance implementing virtualization of the request handling interface.

In such a method, when the processing load of the diagnostic module is determined to be below the threshold and when the anomaly severity representation indicates the low anomaly severity, then the automated anomaly analyzer may: (1) direct the third data processing request to a second diagnostic instrumented module configured to provide virtualization of the request handling interface, and (2) transmit, to a packet data protocol remote sending device that had transmitted the third data processing request, the packet data protocol redirect request for accessing the target computer server system.

Such a method may further include identifying as being non-anomalous, by the automated anomaly analyzer, a third data processing request of the plurality of data processing requests, the third data processing request having been transmitted by a second packet data protocol sending device other than the packet data protocol sending device; directing, by the automated anomaly analyzer, the third data processing request to a third diagnostic instrumented module configured to provide virtualization of the request handling interface, the third diagnostic instrumented module configured to provide an operating system environment different from the diagnostic instrumented module; and transmitting, by the automated anomaly analyzer, to the packet data protocol remote sending device, the packet data protocol redirect request for accessing the target computer server system.

Such a method may further include setting a level of diagnostic instrumentation to be provided by the first diagnostic instrumented module according to an anomaly severity determined, by the automated anomaly analyzer, for the first data processing request.

In such a method, the first diagnostic instrumented module may be a container configured to virtualize the request handling interface, and the third diagnostic instrumented module may be a container configured to virtualize the request handling interface running on a same physical device as the diagnostic instrumented module.

In such a method, the first virtual server and the second virtual server may be managed by a QEMU hypervisor and are run on the same physical machine.

In such a method, the determined anomaly severity may represent an Internet worm or a computer virus.

In such a method, the determined anomaly severity may represent an SQL injection attack.

In such a method, the first data processing request may comprise a malicious attack.

In such a method, the first data processing request may include a request for a webpage.

According to another aspect of the disclosure, a method of protecting a target computer system against packet data communication exploits, the target computer server system having a request handling interface that responds to a data processing request of a packet data communication, the method includes:

receiving over a data communication network a plurality of data processing requests;

identifying as being non-anomalous, by an automated anomaly analyzer, a second data processing request of the plurality of data processing requests, wherein in response to the identifying as being non-anomalous, the automated anomaly analyzer transmits the second data processing request to the target computer server system;

identifying as being anomalous, by the automated anomaly analyzer, a first data processing request of the plurality of data processing requests, the first data processing request having been transmitted by a first packet data protocol sending device, wherein in response to the identifying as being anomalous, the automated anomaly analyzer:

(1) directs the first data processing request to a diagnostic instrumented module configured to provide virtualization of the request handling interface in processing the first data processing request and to determine an anomaly severity of the first data processing request, and (2) transmits a response, to the first packet data protocol sending device, at a reduced content data byte per second rate compared with a response to the non-anomalous request.

In such a method, the transmitting at the reduced content data byte per second rate may entail generating packets with fewer bits of content data.

Such a method may further include determining a packet data communication exploit suspect, based on processing by the first diagnostic instrumented module, of the first data processing request; and transmitting, in response to the determining, a detection signal indicating the first data processing request as being the packet data communication exploit suspect, wherein the transmitting of the packet data protocol redirect request at the reduced content data byte per second rate is performed without the first data processing request being permitted to reach the request handling interface.

In such a method, the first diagnostic instrumented module may be a container virtualizing the request handling interface.

In such a method, the first diagnostic instrumented module may be running on a diagnostic module comprising a plurality of diagnostic instrumented modules, each diagnostic instrumented module providing virtualization of the request handling interface, wherein the method may further include receiving an indication of a processing load of the diagnostic module;

assigning an anomaly severity representation to a third data processing request of the plurality of data processing requests according to an anomaly severity determined for the third data processing request; and determining whether to direct the third data processing request to the diagnostic module, according to the anomaly severity representation, wherein a determination of whether the third data processing request is sent to the diagnostic module or to the target computer server system is in made in dependence on at least an anomaly severity and a processing load of the diagnostic module, such that when the processing load of the diagnostic module is determined to be below the threshold and when the anomaly severity representation indicates the low anomaly severity, then the automated anomaly analyzer: (1) directs the third data processing request to a second diagnostic instrumented module configured to provide virtualization of the request handling interface, and (2) transmits a response, to a packet data protocol remote sending device that had transmitted the third data processing request, at a reduced content data byte per second rate compared with a response to the non-anomalous request, and wherein when the processing load of the diagnostic module is determined to exceed a threshold and when the anomaly severity representation indicates a low anomaly severity, then the third data processing request is not directed to the diagnostic module and is sent to the target computer server system.

The method of claim 26, wherein the diagnostic module is a virtual server emulator, and each diagnostic instrumented module is a virtual server instance implementing virtualization of the request handling interface.

In such a method, each diagnostic instrumented module may be a container instance implementing virtualization of the request handling interface.

Such a method, may further include setting a level of diagnostic instrumentation to be provided by the diagnostic instrumented module according to an anomaly severity determined, by the automated anomaly analyzer, for the first data processing request.

In such a method, the determined anomaly severity may represent an Internet worm or an SQL injection attack, and the determined maliciousness anomaly severity may represent a computer virus.

According to a further aspect of the invention, a method of protecting a target computer server system from packet data communication exploits, the target computer server system having a request handling interface that responds to a data processing request of a packet data communication, the method includes:

receiving over a data communication network a plurality of data processing requests;

identifying as being non-anomalous, by an automated anomaly analyzer, a second data processing request of the plurality of data processing requests, wherein in response to the identifying as being non-anomalous, the automated anomaly analyzer transmits the second data processing request to the target computer server system;

identifying as being anomalous, by the automated anomaly analyzer, a first data processing request of the plurality of data processing requests, the first data processing request having been transmitted by a first packet data protocol sending device, wherein in response to the identifying as being anomalous, the automated anomaly analyzer: (1) directs the first data processing request to a diagnostic instrumented module configured to provide virtualization of the request handling interface in processing the first data processing request and to determine an anomaly severity of the first data processing request, and (2) transmits, to the first packet data protocol sending device, a response including invoking code requesting additional data from a network server resource other than the first packet data protocol sending device, wherein a response to the non-anomalous request requesting a same data as the data requested by the first data processing request is free of the invoking code.

In such a method, the invoking code may include a reload request, a Javascript reload request, or a Javascript docwrite request.

Such a method may further include determining a packet data communication exploit suspect, based on processing by the first diagnostic instrumented module, of the first data processing request; and transmitting, in response to the determining, a detection signal indicating the first data processing request as being the packet data communication exploit suspect, wherein the transmitting of the packet data protocol redirect request at the reduced content data byte per second rate is performed without the first data processing request being permitted to reach the request handling interface.

In such a method, the first diagnostic instrumented module may be a container virtualizing the request handling interface.

In such a method, the first diagnostic instrumented module may be running on a diagnostic module comprising a plurality of diagnostic instrumented modules, each diagnostic instrumented module providing virtualization of the request handling interface, wherein the method further includes receiving an indication of a processing load of the diagnostic module; assigning an anomaly severity representation to a third data processing request of the plurality of data processing requests according to an anomaly severity determined for the third data processing request; and determining whether to direct the third data processing request to the diagnostic module, according to the anomaly severity representation, wherein a determination of whether the third data processing request is sent to the diagnostic module or to the target computer server system is in made in dependence on at least an anomaly severity and a processing load of the diagnostic module, such that when the processing load of the diagnostic module is determined to be below the threshold and when the anomaly severity representation indicates the low anomaly severity, then the automated anomaly analyzer: (1) directs the third data processing request to a second diagnostic instrumented module configured to provide virtualization of the request handling interface, and (2) transmits, to the first packet data protocol sending device, a response including the invoking code requesting additional data from a network server resource other than the first packet data protocol sending device, and wherein when the processing load of the diagnostic module is determined to exceed a threshold and when the anomaly severity representation indicates a low anomaly severity, then the third data processing request is not directed to the diagnostic module and is sent to the target computer server system.

In such a method, the diagnostic module may be a virtual server emulator, and each diagnostic instrumented module may be a virtual server instance implementing virtualization of the request handling interface, or each diagnostic instrumented module may be a container instance implementing virtualization of the request handling interface.

Such a method may further include setting a level of diagnostic instrumentation to be provided by the diagnostic instrumented module according to an anomaly severity determined, by the automated anomaly analyzer, for the first data processing request.

For example, the determined anomaly severity may represent an Internet worm or an SQL attack, and the determined maliciousness anomaly severity may represent a computer virus.

In such a method, the first data processing request comprises a malicious attack.

In such a method, the first data processing request may include a request for a webpage.

In such a method, the automated anomaly analyzer may be configured further to determine a first suspect in a resource exhaustion attack against the target computer server, the method further including monitoring a first plurality of data processing requests received over the data communication network from a first remote sender;

identifying a first transition, dependent on a first sequence of data processing requests comprising a first data processing request of the first plurality of data processing requests and a second data processing request of the first plurality of data processing requests;

determining a first anomaly profile for the remote sender based on a first anomaly representation assigned to the first transition and a second anomaly representation determined for the first remote sender;

determining based on the first anomaly profile, that the first remote sender is the first suspect in the resource exhaustion attack; and based on the determining of the first suspect, taking action with the automated processor of at least one of: communicating a message dependent on the determining, and modifying at least one data processing request of the first plurality of data processing requests.

Such a method may further include identifying, as a second transition, a second sequence of data processing requests of the first plurality of data processing requests for the first remote sender, wherein the second anomaly representation is an anomaly representation assigned to the second transition.

For example, the resource exhaustion attack may be a distributed denial of service attack.

In such a method, the first anomaly representation and the second anomaly representation may be anomaly values retrieved from a transition anomaly matrix in dependence on the first and second transitions, respectively, and the first anomaly profile for the first remote sender may be determined by combining the first anomaly representation and the second anomaly representation.

The method of claim 53, wherein the taking of the action is performed only after a resource use determination that at least one resource of target computer server is at least one of exhausted or substantially exhausted.

Such a method, may further include monitoring a period of time between a time of the first transition and a time of the determination of the second anomaly representation, wherein the taking of the action is performed only when the period of time is shorter than a predetermined period of time.

Such a method, may further include comparing the first anomaly profile with a first threshold, wherein the first remote sender is determined as the first suspect only when the first anomaly profile is greater than the first threshold.

Such a method may, further include after the first suspect is determined, when at least one resource of the target computer server is at least one of exhausted or substantially exhausted, adjusting the first threshold; and determining a second suspect with a second anomaly profile by comparing the second anomaly profile with the adjusted threshold.

Such a method may, further include assigning the second anomaly representation based on an overlapping range in packets received from the first remote sender.

In such a method, the anomaly analyzer may be positioned at a web server, the data communication network is the Internet, and each data processing request of the first plurality of data processing requests comprises a request for a webpage.

In such a method, the taking the action comprises sending a signal to diminish a response to data processing requests of the first suspect.

Such a method may, further include obtaining a plurality of sampling data processing requests received over the data communication network from a plurality of remote senders;

identifying, as a first sampling transition, a first sequence of data processing requests comprising a first sampling data processing request of the plurality of sampling data processing requests and a second sampling data processing request of the plurality of data processing requests;

identifying, as a second sampling transition, a second sequence of data processing requests comprising the second data processing request and a third data processing request of the plurality of sampling data processing requests; and assigning the first anomaly representation to the first sampling transition as a function of a frequency of the first sampling transition, and assigning the second anomaly representation to the second transition, as a function of a frequency of the second sampling transition.

In such a method, the frequency of the first transition and the frequency of the second transition may be calculated based on the frequency over a period of time of the first sampling transition and the second sampling transition with respect to a totality of the plurality of sampling data processing requests obtained.

Such a method may, further include monitoring a first period of time between a time of the first transition and a time of the determination of the second anomaly representation; and degrading a first value assigned according to a length of the first period of time, the degrading performed according to the second anomaly representation such that an anomaly representation indicating a more anomalous representation results in a degradation of the first value smaller than degradation of the first value according to an anomaly representation indicating a less anomalous representation, wherein the taking of the action is performed only when the first value is greater than zero or a threshold time value.

According to a further aspect of the disclosure, a system is configured to protect a target computer server system against packet data communication exploits, the target computer server system having a request handling interface that responds to a data processing request of a packet data communication received over a data communication network from a first packet data protocol sending device. Such a system may include a network interface configured to receive over the data communication network a plurality of data processing requests;

an automated anomaly analyzer configured to identify as being anomalous a first data processing request of the plurality of data processing requests, the first data processing request having been transmitted by the first packet data protocol sending device; and the automated anomaly analyzer configured to identify as being non-anomalous, a second data processing request of the plurality of data processing requests and, in response to the identifying the second data processing request as being non-anomalous, the automated anomaly analyzer transmits the second data processing request to the target computer server system for preparing a response to the second data processing request, wherein in response to the identifying the first data processing request as being anomalous, the automated anomaly analyzer:

(1) directs the first data processing request to a first diagnostic instrumenter configured to provide virtualization of the request handling interface in processing the first data processing request, and (2) performs a second processing comprising at least one of: (a) transmits, to the first packet data protocol remote sending device, a packet data protocol redirect request for accessing the target computer server system, (b) transmits, to the first packet data protocol sending device, a response to the first data processing request at a reduced content data byte per second rate compared with the rate of the response to the second data processing request, and (c) transmits, to the first packet data protocol sending device, a response including invoking code requesting additional data from a network server resource other than the first packet data protocol sending device, wherein a response to the second data processing request requesting a same data as the data requested by the first data processing request is free of the invoking code.

Such a system may further include the first diagnostic instrumenter.

In such a system, the first diagnostic instrumenter may be configured to determine an anomaly severity of the first data processing request, and to determine that the first data processing request is a packet data communication exploit suspect, based on the anomaly severity.

In such a system, the automated anomaly analyzer may runs on a physical machine, and the first diagnostic instrumenter may run on the same physical machine.

In such a system, the transmitting of the packet data protocol redirect request and the second processing may be performed without the first data processing request being permitted to reach the target computer server system.

Other features and advantages of the present invention will become apparent from the following description of the invention which refers to the accompanying drawings.

The figures of the Drawings illustrate examples of aspects of the invention. Other features and advantages of the present invention will become apparent from the following description of the invention, and/or from the combination of one or more of the figures and the textual description herein, which refers to the accompanying Drawings.

DETAILED DESCRIPTION OF THE EMBODIMENTS

Figure 1:
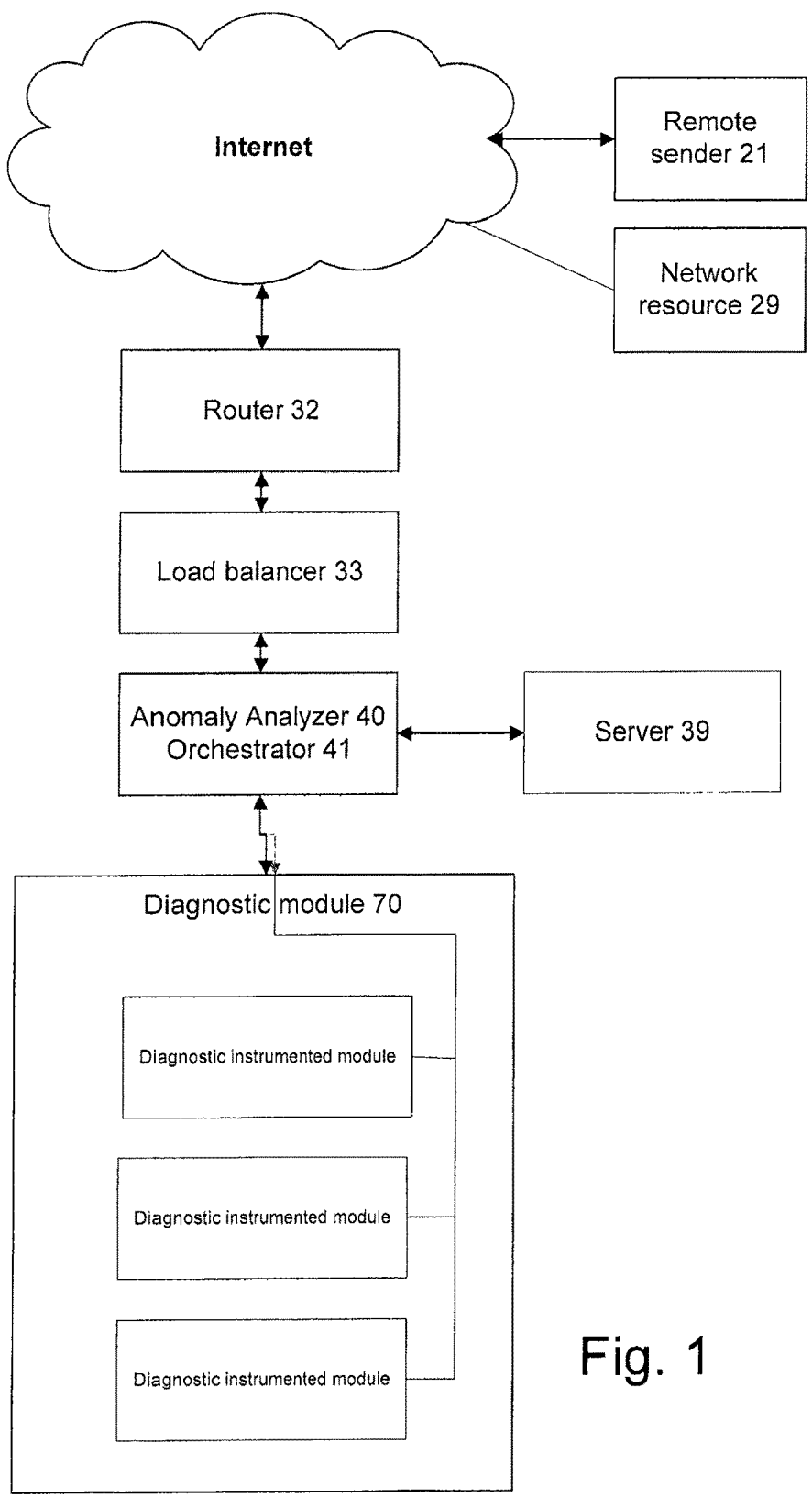
FIG. 1 is an illustration of an example of an overview of a data center including an anomaly analyzer and a diagnostic module, according to an aspect of the present disclosure.

A server, or a set of servers, at a data center is protected by a firewall that includes anomaly analyzer 40. Requests for data from the server and other data processing requests received from remote sender 21 are subjected to a quick analysis by the anomaly analyzer 40 to determine whether the data processing request is "normal," that is, of a type expected. For example, the data processing request may be analyzed in view of previous data processing requests provided by remote sender 21 to server 39 to determine statistical likelihood of the present data processing request being anomalous. Such a "quick analysis" would typically mean that the response to remote sender 21 has to be returned within a reasonable timeframe, that is, within a time sufficiently short to maintain transparency to remote sender 21 of the analysis and processing performed by anomaly analyzer 40. If anomaly analyzer 40 determines that the data processing request is non-anomalous, it may forward the request to server 39 for regular processing. On the other hand, if the anomaly analyzer 40 determines that the data processing request is anomalous, then anomaly analyzer 40 can forward or redirect the data processing request to an emulator, shown in FIG. 1 as a virtual server of diagnostic module 70. A portion of the data processing request, or a set of sequentially received or non-sequentially received data processing requests from the same remote sender 21 may be forwarded as part of a single transmission, or may be forwarded in a piecemeal fashion as they are received in real time or in batch. The execution by emulator of the data processing request can thus be isolated from other system resources and monitored. Each such request, or each portion of such request, can be executed on a separate virtual server, or more than one such request can be executed on the same virtual server. The virtual server can include an operating system and one or more applications of the type to which the target server would have access in processing the request received. The virtual server may be implemented, for example, as a Linux container, other type of container, or similar technology. The virtual machine could have access to only a limited portion of the physical memory available on the diagnostic module 70. Execution of the request received could then be observed and based on the execution, the request can be determined to be a suspect.

Such execution on the emulator or virtual server may take some time. To prevent timing out of the processing request, and to prevent remote sender 21 from finding out or suspecting that the request is being subjected to extensive monitoring or testing, anomaly analyzer 40 can transmit a redirect request to remote sender 21. That is, anomaly analyzer 40 can transmit an alternative URL back to remote sender 21.

Anomaly analyzer 40 can use a variety of strategies to attempt to determine what data request is "normal." For example, anomaly analyzer can parse the data in a form submitted as part of a request by remote sender 21 to determine whether each field includes data, or includes only data, that is expected for the field. A statistical model may be used to determine what data may be acceptable as normal for each field of the online form.

Anomaly analyzer 40, for example, may parse the data processing request received from remote sender 21 intended for target server 39 and look for certain patterns or certain anomalies. For example, HTTP specifies that each line of the header should terminate with a /R (carriage return) and /M (end of line). However, HTTP tolerates a header without the /R at the end of the line. However, a missing /R or a missing /M may indicate an anomalous data processing request. Anomaly analyzer 40 may also refer to a database of specific user agents, for example, bots that have characteristic ways of generating a header of a request. A communication from an agent may appear with a header different from the type of header usually used by a particular version of a browser. For example, Firefox 3.0.3 generates header of a particular format, while a bot tends to generate a header of a different format. While a bot-generated header in of itself may not indicate a malicious request or application exploit at all, it can tend to raise a flag for anomaly analyzer 40, and thus such a request may be given a higher anomaly severity score. The higher anomaly severity score may make it more likely that anomaly analyzer 40 will send the data processing request to the diagnostic instrumented module that provides a virtualization or simulation of the target sever system. By way of further examples, the data processing request may attempt to upload files to places where the target server would not normally put them, seek to modify webpages on the website provided by the target server, and/or access places on the database used by the target server that ordinarily would not be or should not be accessed, or even possibly known about, by most users.

Anomaly analyzer 40 may also refer to a table of known remote senders that have been previously flagged as being high risk and assign a higher anomaly severity score to data processing requests received from such remote senders.

Anomaly analyzer 40 may also have access to a noSQL database or an SQL database or other database to prepare a quick response responsive to the data processing request received from remote sender 21. One or more of such parsing or analyzing techniques may be performed by diagnostic module 70, for example, when the data processing request is run.

Anomaly analyzer 40 may be provided on an existing device in a data center, for example, anomaly analyzer 40 may be deployed as part of a firewall of a data center or may be provided on the device that provides server 39. Anomaly analyzer 40 may be implemented as hardware, software, firmware, or a combination of the foregoing.

Anomaly analyzer 40 may redirect a fixed percentage of requests to a virtual server that anomaly analyzer 40 deems to be non-anomalous or normal. Then, for these redirected non-anomalous requests, anomaly analyzer 40 can transmit a redirect request for accessing the server to a remote sender 21. In this way, the method used by anomaly analyzer 40 to determine what requests are deemed anomalous may be disguised to the remote sender 21. The number or percentage of data processing requests transmitted to the emulator can be throttled depending on how much processing capacity, for example, RAM or other memory resources, processor capacity, or other such computing resources, or a combination of the foregoing, the device or devices providing the emulator has or have left at the current time.

Figure 2:
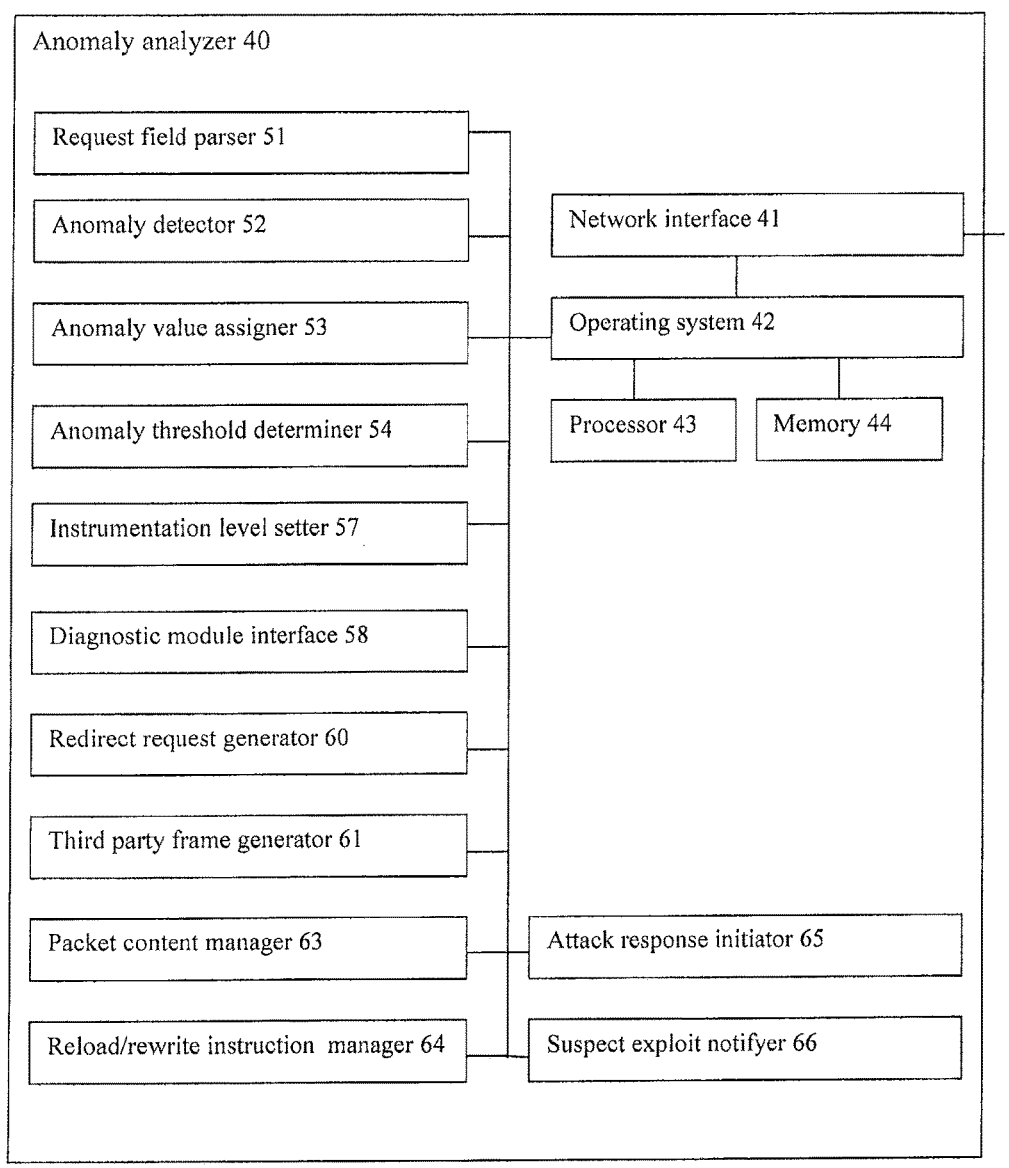
FIG. 2 is an illustration of an example of an overview of components of a suspect analyzer, according to an aspect of the present disclosure.

Components of anomaly analyzer 40 are illustrated in FIG. 2. Request field parser 51 parses the data processing request received by anomaly analyzer 40 via network interface 41. Anomaly analyzer 40 may include operating system 42 which is run on processor 43 with access to memory 44. If anomaly analyzer 40 is not run on a separate machine but is an application run with other applications then such components or modules may be omitted. Anomaly analyzer 40 includes anomaly detector 52 that may refer to a table and detects anomalies.

Anomaly value assigner 53 assigns an anomaly severity score to the data processing request based on the foregoing processing. Anomaly threshold determiner 54 determines what anomaly severity score will allow a straightforward transmission of the data processing request to the server for normal server processing. Also processing load of the diagnostic module 70 may be retrieved to determine whether the data processing request is to be forwarded to the server. Instrumentation level setter 57 sets the type or intensity of the instrumentation to be used by diagnostic module 70. Diagnostic module interface 58 may include orchestrator 41 and interacts diagnostic module 70 to initialize processing by a diagnostic instrumented module.

Redirect request generator 60 transmits a redirect request to a remote sender. Third party frame generator 61 may include one or more requests for processing to a third party network resource in the data set or rendering returned to remote sender 21. Packet content manager 63 may generate packets to be sent to remote sender 21 so as to slow down the transmission of substance of content to remote sender 21. Reload/rewrite instruction manager 64 inserts code, such as JavaScript, into the communication return to remote sender 21. Based on the processing performed by diagnostic module 70, attack response initiator 65 initiates a response appropriate to an attack or performs other processing steps to notify or apprise appropriate network elements or human operators, when an attack is found likely to be occurring, and suspect exploit notifier 66 notifies an appropriate operator or other system component, polls other system components for an occurrence of concurrent attacks, if an application exploit or attack is suspected.

One or more types of redirect request techniques may be used by the anomaly analyzer. In HTTP, a three digit status code having "3" as the first digit may be used for redirection. In HTTP, the location field would then specify the URL of the redirect target. The HTTP refresh feature may also be used to specify a new URL to replace one page with another.

The HTTP redirect request may be tagged so that the system can keep track of the "conversation" with remote sender 21. That is, when remote sender 21 transmits a request responsive to the redirect request, the system may know that this response was received from remote sender 21 pursuant to the redirect request generated by anomaly analyzer 40 earlier transmitted. For example, an HTTP redirect request of the form:
http://www.customer.com/delay-redirect?id=1234567
includes an ID number that identifies the conversation with the remote sender 21 and the earlier flagged anomaly when remote sender 21 had responded to the redirect request. In such an example, the redirect request may include
HTTP 302 FOUND\r\n
.
.
.
location: http://customer.com/delay-redirect?id=1234567.

Another technique that may be employed instead of, or in addition to, the transmission of a redirect request may be to provide a slow response to stall remote sender 21. Such a stalling response would again be consistent with the idea that the processing performed by the diagnostic instrumented module should be transparent to remote sender 21 so as to void giving a clue to remote sender 21 as to what types of data processing requests or anomalies contained therein will trigger anomaly analyzer 40 to flag the data processing request as anomalous.

A delay tool that may be used is similar to a denial of service attack tool Slowloris to generate a response beginning with the header information dribbled out over time. Thus, the TCP or HCTP connection can be maintained with the browser of remote sender 21 as the response is slow walked over time. Packets may be generated with small amounts of content data metered out slowly. The information after the HTTP header may be provided but only after many packets and time have been wasted. For example, LIBPCAP may be used to generate packets with little content data, for example, with header data provided in the course of many packets sent over time and thus delaying the transmission of content data or payload data. Also, other software may also be used to control the amount of content data provided to packets so as to maintain the connection.

Instead of or in addition to the foregoing technique or techniques, another possibility is for anomaly analyzer 40 to transmit to remote sender 21 a reload or rewrite instruction. For example, a JavaScript reload or docwrite instruction maybe included that call for reloading or rewriting the page. In addition, a JavaScript instruction may be included that calls for additional information from the transmitting node or from another network resource. For example, JavaScript includes functionality to make Ajax calls. Thus, much of the webpage provided to remote sender 21 may be blank and with or without containing substantive response to the data processing request that remote sender 21 had sent but an instruction may be included to request rewriting or reloading of the page. In this way, connection with the browser of remote sender 21 may eventually be lost, but the remote sender 21 would get an indication that the requested information is coming. Although examples are provided with reference languages, such as JavaScript and specific protocols, such as HTTP, it will be understood that many other types of languages now known or later developed, may be used instead of or in addition to those described.

Typically, when remote sender 21 responds to the redirect request, based on the URL coding, anomaly analyzer 40 would know that the request from remote sender 21 is pursuant to a redirect request. In this way, the request would not have to be judged ab initio as to anomaly severity. That is, based on the outcome of the processing performed by diagnostic module 70, anomaly analyzer would "know" whether to allow the data processing request to proceed to the target server or to treat the data processing request as a data communication exploit or as malicious. Thus, if the data processing request is deemed to be likely to be malicious or an explication exploit based on the processing performed by diagnostic module 70, then anomaly analyzer 40 could block and kill the data processing request, flag an address or other identifying information of remote sender 21, transmit a signal to an operator or to authorities indicating the occurrence of an attack, pole the system for the existence of other concurrent attacks or the like.

In the alternative, anomaly analyzer 40 may be implemented such that no state is required to be maintained for remote sender 21 and need not keep track of "conversations" in which a redirect request has been transmitted. Instead, the response to the redirect request received from remote sender 21 may be stripped of marking provided by anomaly analyzer 40 to signal that the response has been received pursuant to a redirect request, and then the new data processing request can be sent directly to the target server if the diagnostic instrumented module indicates "clear" or a low likelihood of malice and application exploit, or the request can be killed or otherwise treated as anomalous or malicious if the processing by the diagnostic instrumented module indicates such treatment. Similarly, if no redirect request is transmitted by anomaly analyzer 40 but instead a reload and/or rewrite instruction is included in the response, or if the response is dribbled out over a period time, then anomaly analyzer 40 may need to maintain no state for remote sender 21. That is, with the reload/rewrite implementation or the dribbled response implementation, if the diagnostic instrumented module returns a "clean" diagnosis then the data processing request could be transmitted to the target server, while if the diagnostic instrumented module flags the response as likely constituting an attack, then action appropriate to an exploit or malicious attack can be executed.

A virtual server may be set up with environments to match the needs of the data center and/or server 39. For example, virtual machine can provide an environment, such as Windows 7 or 8 or 8.1 operating system, if server 39 uses such an environment. The server's proprietary code may also be replicated in the virtual server. Hypervisor 71 on which virtual servers are running may be implemented in a variety of ways. For example, hypervisor may be a QEMU hypervisor. It will be understood that diagnostic module 70 may include a number of physical machines. The malicious communication or application exploit to be detected or to be analyzed may be an SQL injection attack, a worm, a virus or other type of malware.

According to an aspect of the present disclosure, anomaly analyzer 40 can also determine whether the data processing request is to be rejected outright without further processing by the virtual server. In such a case, anomaly analyzer 40 could log or flag the data processing request and prevent transmission of the data processing request to server 39 and to diagnostic module 70. Further, the anomaly analyzer could block all further data processing requests from remote sender 21, e.g., identified by IP address. Further, once malicious behavior is identified, it can be characterized and filtered, thus relieving the anomaly analyzer of the burden of re-analyzing that same type of communication again. Since malicious remote senders 21 typically have a limited variety of attacks against a server, once the attack is characterized, its affects may be mitigated.

According to an aspect of the present disclosure, anomaly analyzer 40 can assign an anomaly score or anomaly profile for the communication. Thus, processing requests with a high anomaly score profile could be rejected outright and killed, or a record of the remote sender of such communications can be maintained so as to flag future communications of this remote sender. Processing requests with a high anomaly severity score or profile but lower than a very high anomaly score profile, can be transmitted to the virtual server and processed as described above. Processing requests with a low anomaly profile (indicating normal behavior) can be forwarded straight to the server without further processing. Alternatively, all processing requests other than those with a low anomaly severity score profile can be forwarded to the virtual server.

When pursuant to a redirect request, remote sender 21 transmits a second data processing request, the system may transmit such a request to the same implementation of anomaly analyzer 40. That is, in a larger data center, a load balancer that is positioned before anomaly analyzer 40 may balance the load by source (that is by sender), so that processing requests are funneled to the same anomaly analyzer 40 as the first time the data processing request came in. Thus, other communications of the same remote sender 21 are sent to the same target server and the same anomaly analyzer 40 each time for at least some period of time. For example, a bot masquerading as a browser may be of higher interest and may earn a greater anomaly severity score by anomaly analyzer 40. This does not necessarily mean that bot data processing requests are malicious. For example, such a communication may simply be from a web crawler or the like. However, such a data processing request may be scored at a higher anomaly score. Anomaly analyzer 40 can manage a table to keep track of every sender suspect and possibly, also of non-suspect senders. Such a table can be decayed or overwritten over a period of time, for example, such a table may have a half-life of 15 minutes or the like. Thus, hierarchy of suspect senders can be maintained such that the most suspicious remote senders can be a given a higher anomaly severity score, and thus data processing requests from such senders may be more likely to be sent to the diagnostic instrumented module. Also, if communications of each potentially suspect remote sender are monitored, then a cumulative anomaly profile score can be assigned to the remote sender. This cumulative anomaly profile score can be used to judge whether data processing requests of this remote sender are to be sent to the diagnostic module.

According to an aspect of the present disclosure, diagnostic module 70 would be kept running at near full processing capacity. Thus, the threshold between high anomaly severity score processing requests that merit forwarding to the virtual machine and transmission of redirect request to remote sender 21 would be throttled according to the processor load of diagnostic module 70. Accordingly, when processing load of diagnostic module 70 is low, even less anomalous processing requests could be sent to virtual server for testing and remote senders of such processing requests would be sent a redirect request. For example, during the night when processing loads are low, a greater percentage or nearly all or all processing requests could be sent to the virtual machine for testing and remote senders of such processing requests would be sent a redirect request. These processing requests could then be used to adaptively update the logic and thresholds of the anomaly analyzer 40 for "normal" traffic, to ensure that the anomaly analyzer 40 has a current profile of the baseline traffic, which will depend on a number of factors, including website content, world events, and the like.

Thus, the anomaly severity score or profile assigned for the data processing request by anomaly analyzer 40 can be used to set the level of emulation and testing to be performed by diagnostic module 70. A severity score or profile indicating a greater severity, that is a higher probability of anomaly could trigger a greater level of emulation.

Diagnostic module 70 may be one or more physical devices with diagnostic instrumented modules that provide instrumented virtualization or simulation of target server 39 or, more particularly, instrumented virtualization or simulation of a request handling interface of server 39 that provides the functionality of server 39 experienced by remote sender data processing requests. The diagnostic instrumented module may be containers, for example headless containers, that share a single kernel of the operating system. This single kernel, for example a LINUX kernel, may be used by all the containers on a particular device. Within each container, visibility may be limited, for example, to the file directory and other necessary resources. Such containers may communicate with the diagnostic module 70 only via sockets so as to provide a more modular or object-oriented processing environment. In the alternative, diagnostic module 70 may be a hypervisor and diagnostic instrumented modules may be virtual machines or virtual serves that provide instrumented virtualization, simulation or emulation of target server 39 or, more particularly, provide instrumented virtualization, simulation or emulation of a request handling interface of server 39 that provides the functionality of server 39 experienced by remote sender data processing requests. In this way, information about execution of the data processing request, runtime intelligence, profiling, performance metrics, and/or feature behavior monitoring may be obtained and/or logged.

Diagnostic instrumented modules may each provide a different operating system environment and may accommodate various types or levels of instrumentation. In addition to receiving the request to be diagnosed and instrumented, diagnostic module 70 may receive anomaly the severity score assigned to the request by anomaly analyzer 40. In addition, or instead of the anomaly severity score, diagnostic module 70 may receive an indication of a type of anomaly detected by anomaly analyzer 40 so as to fine tune the diagnostic process and performance evaluation of the data processing request. Also, anomaly analyzer 40 may provide a request for the intensity or level of diagnostic instrumentation or indicate a type of profiling and performance tracking to be conducted for the data processing request by diagnostic module 70. According to such parameters, diagnostic module 70 may assign the data processing request to an appropriate diagnostic instrumented module. Orchestrator 41 may initiate or control the execution of diagnostic instrumented modules.

According to an aspect of the disclosure, diagnostic module 70 and server 39 may be provided on the same physical device or set of physical devices. Further, according to an aspect of the disclosure, server 39 need not be provided as an entity separate from diagnostic module 70. That is, all data processing requests may be transmitted by anomaly analyzer 40 to diagnostic module 70, such that anomalous communications are processed in an emulation mode and non-anomalous communications are processed in a non-emulated mode, as dictated by the anomaly severity score determined by anomaly analyzer 40.

As part of the redirect request, a third party server, such as an advertising server, could be requested to send data. For example, an ad server may provide an iFrame to be included in a page rendered to the remote sender.

An anomaly profile for a remote user may also be computed in other ways. For example, an anomaly representation may be assigned when a series of data packets in a communication stream have an overlapping range of byte counters, which generate an ambiguity due to different content in the overlapping range. Such overlapping ranges within packets may evidence an attempt to disguise an attack, and are unlikely to occur persistently for any given remote sender or data request source, especially if the communication is otherwise unimpaired.

Based on the processing of the data processing request by diagnostic module 70, a result of the processing could be returned to remote sender 21. For example, when the data processing request is determined by diagnostic module 70 to be non-suspect, then the processing result or results of the data processing request generated by virtual server can be transmitted back to anomaly analyzer 40 for transmission to remote server 21. Or, when the data processing request is determined by diagnostic module 70 to be non-suspect, then the data processing request can be transmitted to server 39 by anomaly analyzer 40 for regular processing.

The redirect request may be coded, for example, the URL provided may be a coded URL. Thus, when a second data processing request is received by anomaly analyzer 40 in response to the redirect request, this second data processing request may be destroyed according to an aspect of the disclosure. This is because the first data processing request will have been processed and responded to, as appropriate.

When the data processing request is determined according to processing by diagnostic module 70 to be a malicious communication suspect, one or more actions may be taken. Anomaly analyzer 40 may be alerted. The system may:
(1) block all further communications or data processing requests from the remote sender 21 that had sent the data processing request;
(2) transmit a signal informing of the attack and detailing the remote sender and/or the data processing request to a system administrator;
(3) add the remote sender 21 to a list and automatically transmit further data processing requests from the remote sender 21 to diagnostic module 70 (and block from being transmitted to server 39 all such data processing requests) for processing without anomaly analyzer 40 performing an anomaly analysis;
(4) add the remote sender 21 to a list and flag further data processing requests from the remote sender 21 to make it more likely that the data processing communication is sent to diagnostic module 70 (and blocked from being sent to server 39);
(5) alert law enforcement or other authorities, or alert a human operator;
(6) modify the data processing request to remove malicious communication or malware and respond to remaining portions of the data processing request by transmitting results of the processing performed by diagnostic module 70;
(7) log automatically the attack detailing the remote sender and/or the data processing request;
(8) poll other system components, such as other instances of anomaly analyzer 40, to determine whether an attack has been detected from this and/or other remote senders;
(9) perform a combination of the foregoing steps.

Figure 3:
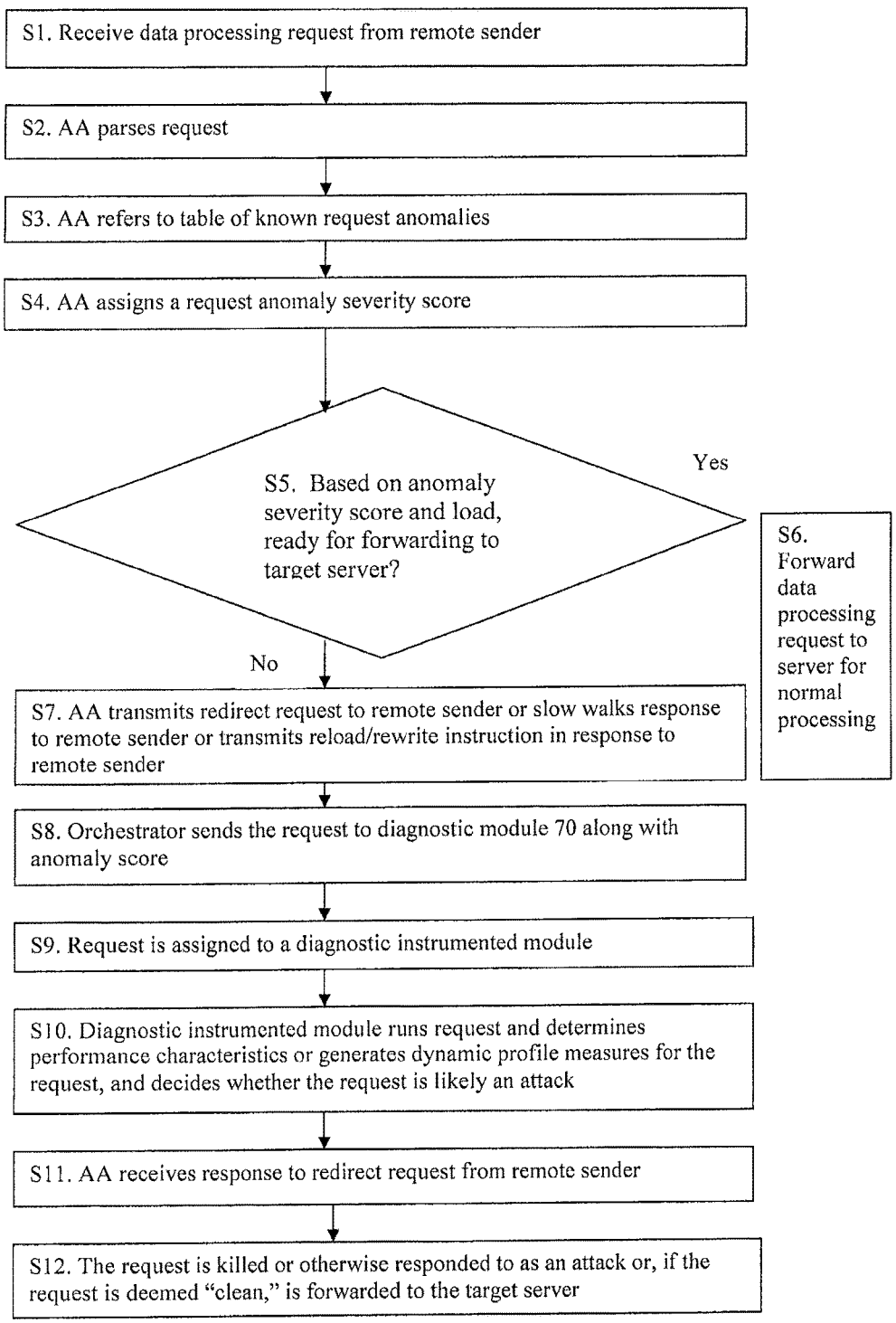
FIG. 3 is a flowchart illustrating an example of a process according to an aspect of the present disclosure.

FIG. 3 illustrates a flowchart providing an example of a processor according to an aspect of the invention. At S1, a data processing request is received from a remote sender 21 by a server system, such as a data center.

At S2, an anomaly analyzer 40 parses the data processing request. At S3, anomaly analyzer 40 refers to a table of known request anomalies or otherwise determines the presence of an anomalous data or code. At S4, an anomaly analyzer 40 assigns a request anomaly severity score to the data processing request. At S5, the anomaly analyzer 40 determines, based on an anomaly severity score determined and based on a processing load of diagnostic module 70, whether the data processing request is to be forwarded to server 39. If yes, then the data processing request is forwarded at step S6 to server 39 for normal processing. Otherwise, anomaly analyzer 40 transmits a redirect request to the remote sender, provides a slow walk response to the remote sender or transmits a reload/rewrite instruction in response to the remote sender. At S8, orchestrator sends the data processing request to diagnostic module 70 and may also send the anomaly severity score that was generated before the data processing request. At S9, the request is assigned to a diagnostic instrumented module.

The diagnostic instrumented module runs the data processing request and determines performance characteristics or generates dynamic profile measures or obtains other parameters according to an execution of the instrumented processing of the data processing request, and accordingly, decides whether the data processing request is likely to be an attack. At S11, anomaly analyzer receives a response to the redirect request from the remote sender and according to the processing performed by the diagnostic module 70, the request is killed or otherwise responded to as an attack or, if the data processing request is deemed to be relatively safe, it may be forwarded at that time to server 39 for other processing requests by the server.

The present methods, functions, systems, computer-readable medium product, or the like may be implemented using hardware, software, firmware or a combination of the foregoing, and may be implemented in one or more computer systems or other processing systems, such that no human operation may be necessary. That is, the methods and functions can be performed entirely automatically through machine operations, but need not be entirely performed by machines. A computer or computer systems including anomaly analyzer and that includes diagnostic module 70 as described herein may include one or more processors in one or more units for performing the system according to the present disclosure, and these computers or processors may be located in a cloud or may be provided in a local enterprise setting or off premises at a third party contractor.

The communication interface may include a wired or wireless interface communicating over TCP/IP paradigm or other types of protocols, and may communicate via a wire, cable, fire optics, a telephone line, a cellular link, a radio frequency link, such as WI-FI or Bluetooth, a LAN, a WAN, VPN, or other such communication channels and networks, or via a combination of the foregoing.

Also, an anomaly analyzer may include or may be provided as part of a resource exhaustion attack anomaly analyzer that protects the server. For example, the resource exhaustion attack may be denial of service or distributed denial service attack.

According to a further aspect of the disclosure, communication sessions comprising transaction processing requests, such as a request for a webpage from a webserver, are tracked and a transition between a first data request from a sender and a second data request from the sender is assigned an anomaly representation, such as a value that represents a probability of the sequence of data requests, according to a transition anomaly value matrix earlier generated. The transition need not be between two simple states, but rather the transition is the new state based on the sequence of actions leading to the immediately prior state. For example, during a learning mode, normal web traffic to a site may be monitored and analyzed, such that the probability of each transition between data requests is assigned a probability value. In addition, data packets may be analyzed for additional suspect features, such as an overlapping range of byte counters in a series of packets. An anomaly representation may be assigned for the sender based on a detection of such packets, and this anomaly representation may be combined with the anomaly representation assigned for the transition. Then, based on a cumulative anomaly profile for the remote sender or source of the data requests, based on a combination of the anomaly representations of the preceding and current transitions, the remote sender can be identified as a probable suspect and appropriate action, such as instructing a cessation of responding to the remote sender's requests, can be initiated. Transmitting a redirect request or slow walking a response to a node engaged in a denial of service attack may tie up to some extent the bombardment of requests emanating from the node.

In some cases, multiple remote senders show similar anomaly representations. This is a very good indicator of a botnet. These remote senders can be aggregated and the collective anomaly representations could be analyzed for more evident attack. In some cases, anomalous communications are observed, but these do not appear to be, or be part of, an impending threat or significant cost in terms of consumed resources. In those cases, the communication session may be permitted to continue uninterrupted, e.g., with careful analysis and logging of the behavior. This anomalous behavior trigger may be forwarded to other security servers within the infrastructure, in case the behavior is malicious but not part of a DDoS attack. Of course, the system and method according to the present technology may provide behavioral analysis of web traffic for a variety of purposes, only one of which is DDoS detection.

Figure 5:
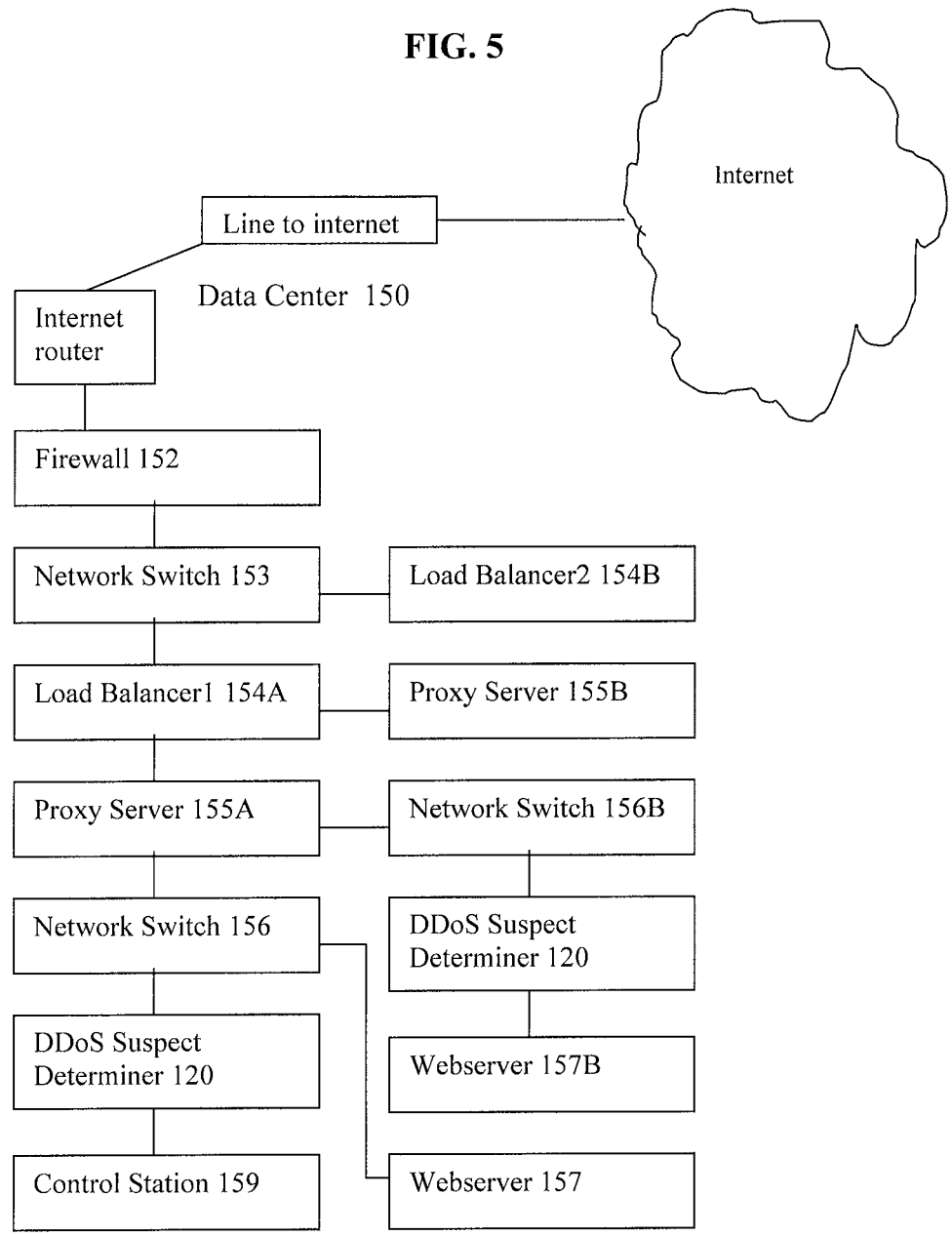
FIG. 5 is an illustration of an example of an overview of a data center including the suspect determination engine according to an aspect of the present disclosure.

A typical data center for a large website installation, such as that of a major bank, may be a computer cluster or set of racks which provide network services to hundreds of client requests per second. For example, as illustrated in FIG. 5, one or more OC-3 or OC-12, OC-24, OC-48, OC-192, or other types of high speed lines now known or later developed or other types of connection to a data network, such as the Internet, may deliver and/or receive 40 gigabytes per second or more of network traffic data.

Typically, one or more firewall devices 152 will be positioned to monitor incoming network traffic based on applied rule sets. In this way, the firewall device establishes a barrier, for example by monitoring incoming network data for malicious activity, such as generated by known or unknown Trojan horses, worms, viruses and the like. The firewall may detect the data at the application level of the OSI model.

In addition to the firewall, a network switch 153 may be positioned to connect devices together on the computer network by forwarding data to one or more destination devices. Typically, the destination device's Media Access Control (MAC) address is used to forward the data. Often, the network switch is positioned after the firewall. One or more load balancer (154A, 154B) may be positioned to distribute the traffic load to a number of devices. One or more proxy servers, and additional network switches 156 may also be provided. Devices connected to load balancer 154B and to proxy server 155B are not illustrated in FIG. 5 for the sake of clarity and brevity. The web server(s) is typically located behind these devices, and perhaps additional firewalls. In this context, "located behind" a first device refers to the logical positioning or communicative positioning of the devices, not necessarily to the physical positioning of the devices on the rack or set of racks. Also illustrated in FIG. 5 is a deployment of DDoS suspect determiner 120 inline, that is, before webserver 157B. Another network switch, illustrated in FIG. 5 as network switch 156B, may be connected to proxy server 155A, and DDoS suspect determiner 120 may be behind it. One or more webservers, by way of example illustrated as webserver 157B, may be located behind or hanged off of this DDoS suspect determiner 120. It will be understood that one or both of such DDoS suspect determiners may be deployed, or more than two such DDoS suspect determiners may be positioned in a data center. In addition, one DDoS suspect determiner 120, for example, the one positioned off to a side, as shown on the left side of FIG. 5, may be set in an monitoring mode, for example, in a testing or evaluation phase of DDoS suspect determiner 120, while the second one, for example, the DDoS suspect determiner in front of webserver 157B, may be used in the active/defense mode.

Anomaly analyzer 40 and/or orchestrator 41 may be located in a same device as DDoS suspect determiner 120 or may be positioned in one or more adjacent devices at the same point in the data center configuration, or at another position in the data center or off site. Diagnostic module 70 may be part of the same device as anomaly analyzer and/or as orchestrator 41, may be located in one or more adjacent devices in the same point in the data center configuration or it may be in at a different position in the data center.

Additional devices (not illustrated in FIG. 5) may also be provided on the rack, as would be readily understood. For example, a database system, such as a SQL or NoSQL database system, for example Cassandra, may be provided to respond to queries generated by or passed through the web server(s). Thus, one or more databases and additional firewalls may be positioned behind the web servers. In addition, many other "blades" and other hardware, such as network attached storage devices and backup storage devices and other peripheral devices may also be connected to otherwise provided on the rack. It will be understood that the rack configuration is discussed and provided by way of illustrative example, however many other configurations and more than one of such devices may be provided on the rack. A cloud-based architecture is also contemplated, according to which suspect determination engine 120 is located off site in the cloud, for example, at third-party vendor premises, and incoming packets or a copy of incoming packets are transmitted by the data center thereto. Also contemplated is a virtual machine or virtual appliance implementation, provided in the cloud, as discussed, or provided at the data center premises to be defended. In such an implementation, one or more existing devices, for example, server computers or other computers, run software that provides an instance of, or provides the functionality described for, DDoS suspect determination engine 120.

Figure 4:
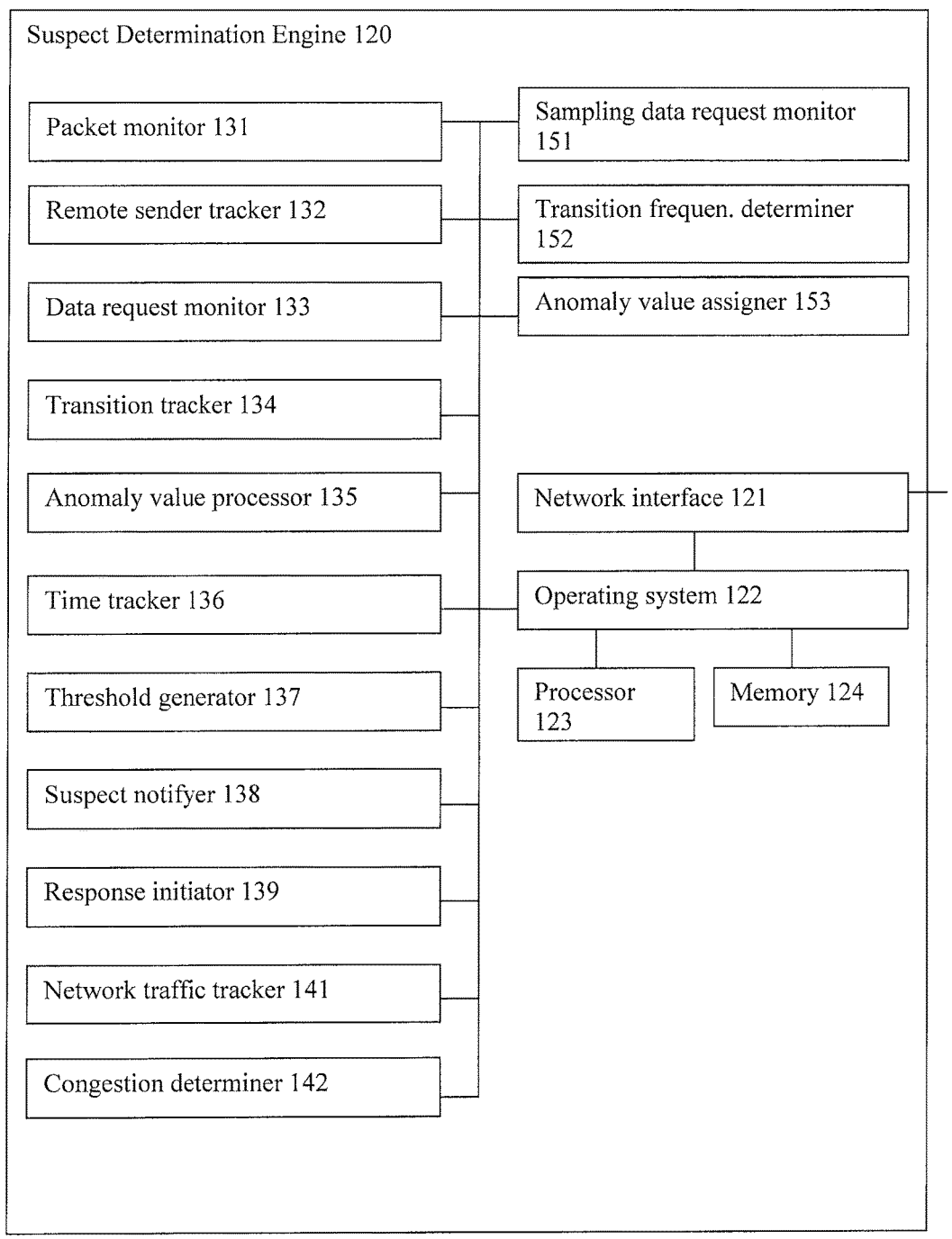
FIG. 4 is an illustration of an example of an overview of components of a suspect determination engine according to an aspect of the present disclosure.

FIG. 4 illustrates suspect determination engine 120, which includes a network interface 121 that may receive data from a switch or SPAN port that provides port mirroring for the suspect determination engine 120. For example, suspect determination engine 120 may be provided as a separate device or "blade" on a rack and may receive from a network switch the same data stream provided to the web server device, or may act as a filter with the data stream passing through the device. The data stream may be decoded at this stage. That is, in order to assess probability of malicious behavior by way of an anomaly score, packet content inspection is required. In the alternative, suspect determination engine 120 may be integrated into one or more devices of the data center. Suspect determination engine may be implemented as software, hardware, firmware or as a combination of the foregoing.

According to an aspect of the disclosure, suspect determination engine 120 may be positioned just before the webpage server as one or more devices. However, it will be understood that other configurations are also possible. Suspect determination engine 120 may be provided as part of more than one device on a rack, or may be provided as a software or hardware module, or a combination of software or hardware modules on a device with other functions. One such suspect determination engine 120 may be provided at each webserver 157. Because in some cases the behavior may only emerge as being anomalous over a series of packets and their contained requests, the engine may analyze the network traffic before it is distributed to distributed servers, since in a large data center, a series of requests from a single source may be handled by multiple servers over a course of time, due in part to the load balancer. This would particularly be the case if anomalous behavior consumes resources of a first server, making it unavailable for subsequent processing of requests, such that the load balancer would target subsequent requests to another server.

The at least one load balancer may be programmed to send all requests from a respective remote sender or source to only one web server. This requires, of course, that the load balancer maintain a profile for each communication session or remote sender. In this way, each suspect determination engine 120 will "see" all data requests from a single remote sender, at least in any given session or period of time. The anomaly score assigned to the remote sender will therefore be based on data from all data requests of the respective remote sender. Accordingly, suspect determination engine 120 may receive a copy of all or virtually all network packets received by the webserver from a given remote sender.

The present technology encompasses a system and method for monitoring a stream of Internet traffic from a plurality of sources, to determine malicious behavior, especially at a firewall of a data center hosting web servers. Each packet or group of packets comprising a communication stream may be analyzed for anomalous behavior by tracking actions and sequences of actions and comparing these to profiles of typical users, especially under normal circumstances. Behavior expressed within a communication stream that is statistically similar to various types of normal behavior is allowed to pass, and may be used to adaptively update the "normal" statistics. In order to track communication streams over time, an anomaly accumulator may be provided, which provides one or more scalar values which indicate a risk that a respective stream represents anomalous actionable behavior or malicious behavior. The accumulator may be time or action weighted, so that activities which are rare, but not indicative of an attempt to consume limited resources, do not result in a false positive. On the other hand, if a series of activities represented in a communication stream are rare within the set of normal communication streams, and include actions that appear intended to consume limited resources, and especially if multiple previously rare actions are observed concurrently, the system may block those communication streams from consuming those resources. In some cases, a variety of defensive actions may be employed. For example, in high risk situations, the IP address from which the attack emanates may be blocked, and the actions or sequences of actions characteristic of the attack coded as a high risk of anomalous behavior for other communication streams. In moderate risk situations, the processing of the communication stream may be throttled, such that sufficiently few transactions of the anomalous resource consuming type are processed within each interval, so that the resource is conserved for other users. In low risk situations, the communication stream may continue uninterrupted, with continued monitoring of the communication stream for further anomalous behavior.

Therefore, one aspect of the technology comprises concurrently monitoring a plurality of interactive communication sessions each over a series of communication exchanges, to characterize each respective interactive communication session with respect to one or more statistical anomaly parameters, wherein the characterization relates to probability of coordinate malicious or abnormal resource consumption behavior. The characterization is preferably cumulative, with a decay. As the negative log of the cumulative characterization exceeds a threshold, which may be static or adaptive, defensive actions may be triggered.

In a learning mode, sampling data request monitor 151 monitors data requests received from each remote sender. A sequence of two data requests from the remote sender is interpreted as a "transition." Transition tracker 134 can identify such sequences of data requests, such as webpage requests from a sender.

Pages may request information even when a human user is not requesting information. There may be automatic transitions, for example, image tags can be downloaded, iframe tags, JAVASCRIPT can be rendered, and the like. In addition, proxies can cache images, such as a company logo, as an image tag. Thus, such data may not be requested and may not be counted (i.e., ignored) as a "transition," depending on the prior state of the rendered page. This filtering helps to identify user "actions", and permit scoring of such actions with respect to anomalous behavior.

Accordingly, transition tracker 134 may keep track of the referer header information. Thus, JAVASCRIPT, or a logo image information can be filtered out because such objects do not refer to some other object. Thus, a transition may only be interpreted as such if the data request sequence includes a change according to the internal referer headers of the most recent requests.

A frequency of each transition is determined by transition frequency determiner 152. More common transitions (during normal traffic periods) may be assigned a low anomaly representation, such as a numerical value, a percentage, a value on a scale from zero to one, or some other representation of anomaly for the transition. Anomaly representations for transitions may be stored in a transitory anomaly matrix as logarithmic values and thus the anomaly representation may be combined on a logarithmic scale to arrive at a total running anomaly score or anomaly profile for the remote sender or source. Less frequent transitions are assigned a higher anomaly representation. An example of a common transition may be a request for an "About Us" page from the homepage of a site. An example of a less common transition, but not necessarily a rare transition, may be a request for "Privacy Policy" from the homepage. A rare transition, and therefore one that earns a higher anomaly value, may be a request for an obscure page to which there is no link at all from the previous page. Also, transition timings may be kept track of. For example, requesting pages within milliseconds or some other very short intervals may be a warning sign that the requests are generated by a bot. Repeated sequential requests for the same page may also be treated as more suspect.

Figure 7:
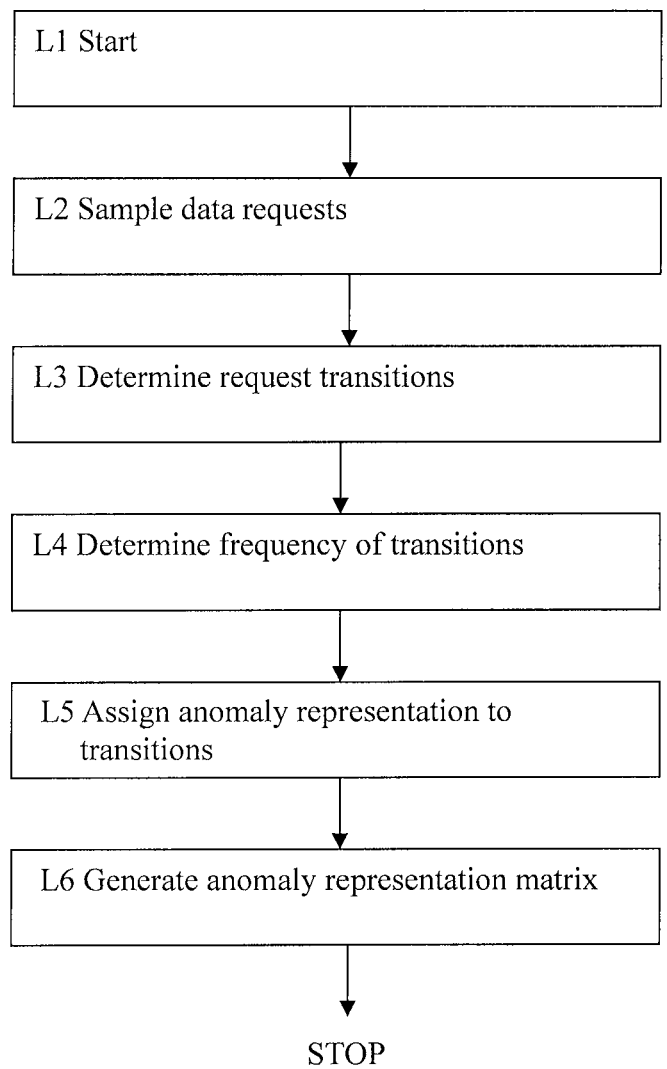
FIG. 7 illustrates a process of learning normal "human"-driven transition behavior and of generating an anomaly representations matrix according to an aspect of the present disclosure.

A machine learning mode as illustrated in FIG. 7. After the suspect determination engine 20 or components thereof are deployed, learning may start at L1 of FIG. 7. At L2, all or some of data requests or other network traffic from the remote sender may be sampled and sequences or transitions between the data requests from the remote sender may be determined at L3. At L4, based on the frequency of transitions, anomaly representations are assigned to generate a lookup table or transition anomaly representation matrix at L6. This machine learning may be continued for a period of time, for a pre-defined number of data requests or preset number of transitions, for a preset number of remote senders, or until the learning is stopped. A fully adaptive system is also possible, which continually learns. However, upon detection of a possible attack, or if a source appears to be acting anomalously, learning mode may be quickly suspended and the defense mode may be deployed. Typically, the system detects anomalies by detecting rare patterns of transitions, which may in the aggregate increase over historical averages. The system therefore is sensitive to rare transitions. It does not necessarily analyze the rare transitions to determine the nature of a threat, though for a small portion of network traffic, the suspect communication sessions may be forwarded to an instrumented server to determine the nature of the potential threat. In some cases, it is also possible to produce a statistical analysis of a positive correlation with malicious behavior, such that the rarity of the behavior is not per se the trigger, but rather the similarity to previously identified malicious behavior. Such a system is not necessarily responsive to emerging threats, but can be used to abate previously known threats.

Based on these anomaly values, in a deployed DDoS protection mode, suspect determination engine 120 or components thereof may monitor traffic to determine a resource exhaustion attack. Data request monitor 133 monitors each data request, such as a webpage request from a remote sender, and transition tracker 134 determines when a transition between two data requests has taken place. Transition tracker 134 also retrieves from the transition matrix anomaly values for each respective transition.

Anomaly value processor 135 then assigns a running anomaly profile to the remote sender, which is kept track of by the remote sender traffic 132. For example, transition anomaly values for the remote sender can be added and a running anomaly value for the remote user can thus be tabulated. When the anomaly value tabulated for the remote sender meets or exceeds a given anomaly value threshold, then remote sender can be identified as a suspect.

If the remote sender does not exceed the threshold anomaly value within a certain period of time, for example, ten seconds, five seconds, 30 seconds, two hours or from learned models specific for the resource under test, for example, five times the average gap hit for the URL, or within some other time interval then the anomaly profile for the remote sender can be reset to zero or decay. The accumulation may also be based on a number of transitions. Time tracker 36 can keep track of the first transition detected for the remote sender and when the period of time expires, can send a signal to reset the anomaly value tabulated for the remote sender, unless the remote sender has reached the actionable threshold value within the period of time. A gradual decay for a total anomaly value for a sender is also contemplated. An example of such a gradual decay implementation is as follows: a time may be tracked since the occurrence of the previous transition with a statistically significant transition value. A transition with an assigned anomaly value lower than a threshold of statistical significance may be ignored and not used in the total anomaly score of the sender for purposes of such an implementation, but in any case the timing of such a prior statistically insignificant transition may be ignored by such an implementation. The total anomaly value for the sender is then decayed according to how much time has occurred since the previous significant transition. The longer the time that has elapsed, the more the total anomaly score for the sender can be decayed. If less than a threshold amount of time has elapsed since the most recent statistically significant transition, then there may be no decay calculated at all in the total anomaly value for the sender. In this way, the system needs to be keep track only of the time elapsed since the most recent statistically significant transition and the total anomaly value for the sender when processing the anomaly value of the current transition for each sender. The timing of a transition may be calculated based on a time of the receipt of a request for the webpage.

Action may be taken when the suspect remote sender is identified. For example, the action may to send a signal to a control station 159 illustrated in FIG. 5, which may be notified to a human operator, shutting down the remote sender's packets received by webserver 157 that is receiving this remote sender's data traffic, alerting authorities or other actions.

However, according to an aspect of the disclosure, no action is taken unless network congestion, resource exhaustion or substantial resource exhaustion is detected, for example, by network switch 156, by webserver 157, by an earlier positioned network interface, or by a combination of the foregoing. Such network congestion or resource exhaustion or substantial resource exhaustion may evidence an ongoing DDoS or other resource exhaustion attack. In this way, the risk of acting based on false positives may be mitigated.

Network traffic tracker 141 can track a level of current network traffic. For example, network traffic tracker 141 may monitor a number of gigabits of data currently being received or sent by the website installation or a component thereof. Congestion determiner 142 may signal the existence of network congestion when a certain level of network traffic exists, when server utilization normalized for time of day, day or week and holidays is outside of normal bounds, based on a high CPU utilization of one or more device at data center 150, when heat detected at one or more devices of data center 150 exceeds a preset temperature, or the like. For example, congestion determiner 142 may signal the existence of congestion when the traffic is at or near the maximum bandwidth capacity of the installation. For example, if the installation can handle 40 gigabits per second of incoming network traffic, then congestion may be determined when traffic reaches 80% or more of the maximum or 97% or more of the maximum or the like, or when such network traffic levels prevail for longer than a previously set time, such as three seconds, five seconds, seven seconds or the like. Also, network congestion tracker 141 in determining whether congestion exists may keep track of how long it takes webservers to respond to requests compared to standard response times that they learn in a learning mode or obtain elsewhere. Another metric is what percentage of requests are servers able to respond to successfully. If they are not responding to nearly all of them then it is evidence of network congestion.

Once congestion is determined, one or more actions may be taken when the tabulated or otherwise computer anomaly profile for remote sender exceeds or meets the threshold set by threshold generator 137.

Threshold generator 137 can provide a dynamic threshold that is throttled. For example, a remote sender or source with the highest anomaly score or profile may be filtered or blocked, and a threshold may be adjusted down to filter out the next highest anomaly profile remote sender until the system is no longer under attack. The system can monitor whether response time has improved and if it has not, then dynamic thresholding may be continued to adjust down the threshold.

Figure 6A:
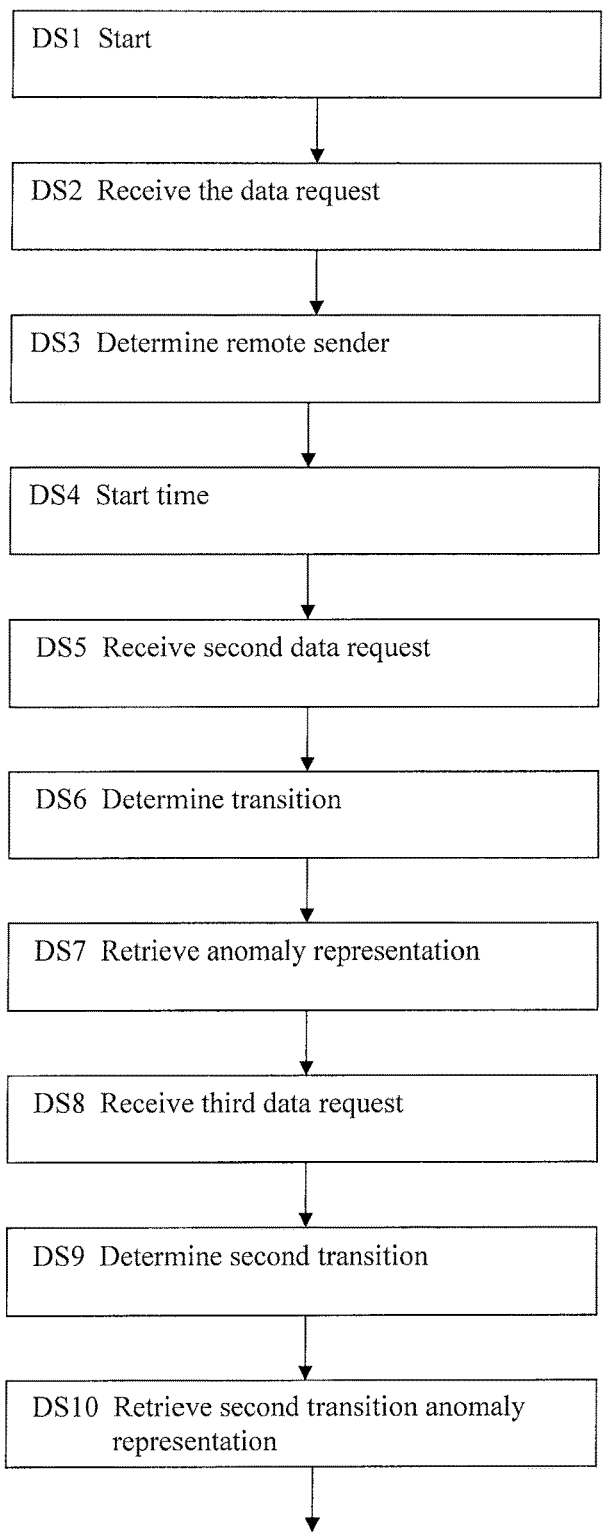
FIGS. 6A-6B illustrate a process of determining a suspect in a resource exhaustion attack according to an aspect of the present disclosure.

An example of a DDoS protection deployment mode will now be described with reference to FIGS. 6A-6B.

After the suspect determination engine 120 is deployed and started at DS1, a data request is received at DS2 and the remote sender is determined at DS3. At this time, a clock at DS4 may be started to keep track of the time of the first data request from the remote sender. Alternatively, a clock may be started when the first transition between the first data request and the second data request from this remote sender is determined or at some other such time. At DS5, a second data request is received from the remote sender, and a first transition is determined at DS6. At DS7, an anomaly representation for this first transition is retrieved from the transition anomaly representation matrix or lookup table or the like previously generated in the transition anomaly learning mode. Hash tables may be used to keep track of transition anomaly scores and timings. A source-URL key may be used for a hash table that stores the time of (or since) the most recent request by a source/sender for a URL. As discussed, according to one implementation, only the timing of transitions with statistically significant anomaly scores (or transitions with an anomaly scores higher than a threshold) need be stored. A URL-URL key may be used for a hash table that stores anomaly values for transitions between URL requests. Memory pruning techniques may be used on a regular basis or near constantly as a background process to delete information in tables with the least utility or relevance.

At DS8, a third data request is received and a second transition between the second data request and the third data request is determined at DS9. At DS10, the second transition anomaly representation is retrieved for the second transition from the transition anomaly representation matrix. At DS11, an anomaly profile for the remote sender or source of the data traffic is tabulated or otherwise computed derived at an anomaly profile for the remote sender.

At DS12, the anomaly profile is compared with an anomaly threshold previously set. If the time from the time clock started at the time of the receipt of the first data request or the determination of the first transition or the assigning of the first anomaly representation or at some other such relevant time until the comparison with the anomaly threshold or until the retrieval of the second or most recent anomaly representation has not expired, then at DS14, it is determined whether the network is congested or the resource is exhausted or nearly or substantially exhausted. If the time period has expired or if the network congestion or resource exhaustion is determined, then a system returns processing to DS1 and the anomaly profile for the remote sender may be erased, or the anomaly score represented in the profile diminished or decayed.

Figure 6B:
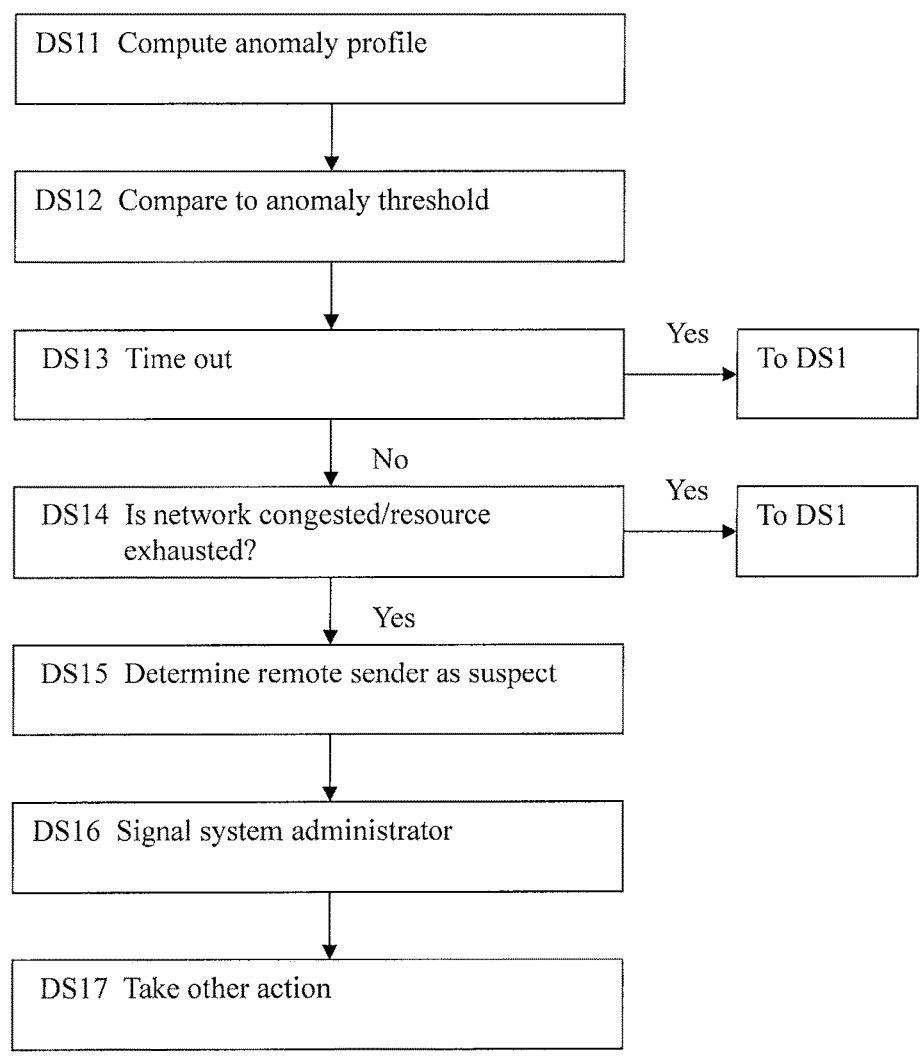
Figure 8:
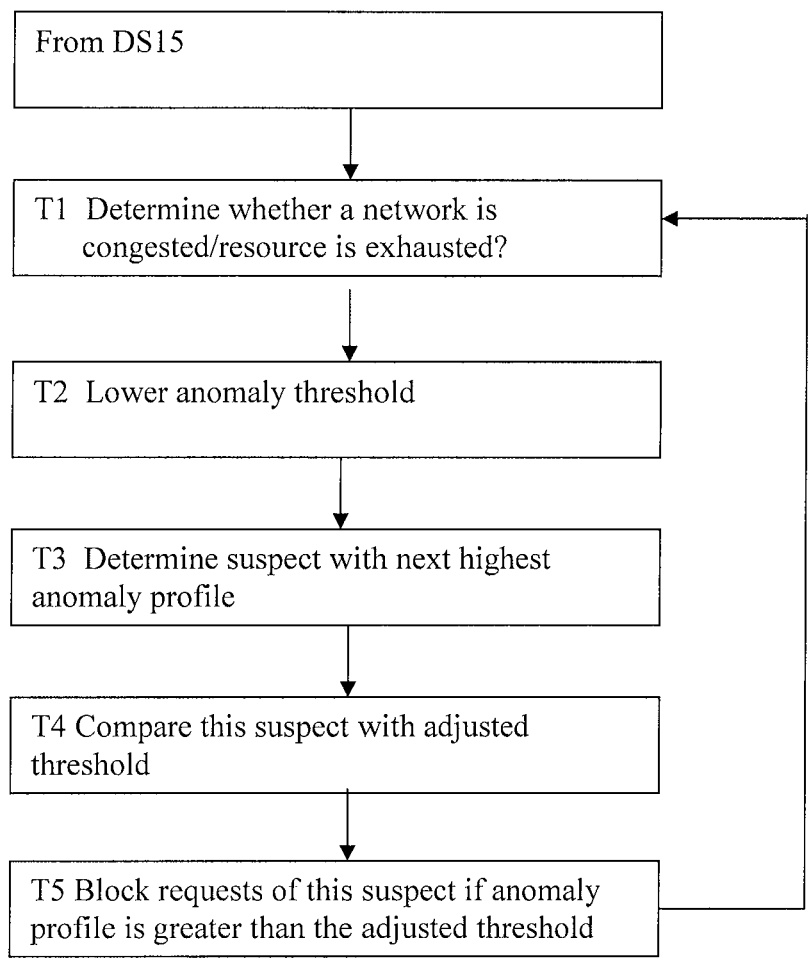
FIG. 8 illustrates a process of threshold throttling according to an aspect of the present disclosure.

FIG. 8 illustrates an example of threshold throttling performed after a first suspect is determined and traffic from this first suspect have been blocked at DS15 in FIG. 6B. At T1 in FIG. 8, it is determined whether the network is congested and/or one or more resources of the data center are exhausted or substantially exhausted. At T2, the threshold is lowered. At T3 the next suspect, which may be the suspect with the next highest anomaly profile, is determined, and at T4 the anomaly profile is compared with the adjusted threshold. If this anomaly profile exceeds the adjusted threshold, this suspect is blocked and processing continues to T1.

On the other hand, if the period has not timed out at DS13 and if the network congestion/resource exhaustion is not determined at DS14, then the remote sender is determined as a suspect, and appropriate action may be taken. At DS16, the system administrator may be signaled, which may be a human user, and other action at DS17 may be taken, such as signaling one or more components of the data center 150 to block all data requests received from the remote sender or to not respond to the remote sender, or the like.

Suspect determination engine 120 may be provided on one or more devices working in tandem, which may be any type of computer, cable of communicating with a second processor, including a "blade" provided on a rack, custom-designed hardware, a laptop, notebook, or other portable device. By way of illustrative example, an Apache webserver may be used running on LINUX. However, it will be understood that other systems may also be used.

An anomaly profile for a remote user may also be computed in other ways. For example, an anomaly representation may be assigned when a series of data packets in a communication stream have an overlapping range of byte counters, which generate an ambiguity due to different content in the overlapping range. Such overlapping ranges within packets may evidence an attempt to disguise an attack, and are unlikely to occur persistently for any given remote sender or data request source, especially if the communication is otherwise unimpaired.

Accordingly, a method, system, device and the means for providing such a method are described for providing improved protection against a malicious communication, malicious processing request, and/or malware attack. An improved and more secure computer system is thus provided for. Accordingly, a computer system, such as a website, can thus be more robust, more secure and more protected against such an attack. In addition, because anomaly analyzer can send potentially suspicious communications to diagnostic module 70 for further testing, a faster detection and an improved device response performance with fewer unnecessary computing resources may be achieved. That is, the machine and the computer system may respond faster and with less risk of shutting down a remote sender based on false positives and less risk of failure to determine a suspect. As a result of the faster and more accurate response, less energy may be consumed by the computer system in case of such an attack, and less wasteful heat may be generated and dissipated.

Although the present invention has been described in relation to particular embodiments thereof, many other variations and modifications and other uses will become apparent to those skilled in the art. Steps outlined in sequence need not necessarily be performed in sequence, not all steps need necessarily be executed and other intervening steps may be inserted. It is preferred, therefore, that the present invention be limited not by the specific disclosure herein.

What is claimed is:

1. A method of protecting, from packet data communication exploits, a target computer server system having a request handling interface that responds to a data processing request of a packet data communication, the method comprising:
   receiving over a data communication network a plurality of data processing requests;
   identifying as being anomalous, by an automated anomaly analyzer, a first data processing request of the plurality of data processing requests, the first data processing request having been transmitted by a first packet data protocol sending device,
   wherein in response to the identifying as being anomalous, the automated anomaly analyzer:
   (1) directs the first data processing request to a first diagnostic instrumented module configured to provide virtualization of the request handling interface in processing the first data processing request and to determine an anomaly severity of the first data processing request, and
   (2) performs a second data processing comprising:
      (a) transmitting, to the first packet data protocol remote sending device, a packet data protocol redirect request for accessing the target computer server system,
      (b) transmitting, to the first packet data protocol sending device, a response to the first data processing request at a reduced content data byte per second rate compared with the rate of the response to the second data processing request, and
      (c) transmitting, to the first packet data protocol sending device, a response including invoking code requesting additional data from a network server resource other than the first packet data protocol sending device; and
   identifying as being non-anomalous, by the automated anomaly analyzer, a second data processing request of the plurality of data processing requests,
   wherein in response to the identifying as being non-anomalous, the automated anomaly analyzer transmits the second data processing request to the target computer server system.

2. The method of claim 1, further comprising: determining a packet data communication exploit suspect, based on processing by the first diagnostic instrumented module, of the first data processing request; and transmitting, in response to the determining, a detection signal indicating the first data processing request as being the packet data communication exploit suspect.

3. The method of claim 1, further comprising: determining a packet data communication exploit suspect, based on processing by the first diagnostic instrumented module, of the first data processing request; and modifying, in response to the determining, the first data processing request.

4. The method of claim 1, wherein the first diagnostic instrumented module is a virtual server virtualizing the request handling interface.

5. The method of claim 1, wherein the first diagnostic instrumented module is a container virtualizing the request handling interface.

6. The method of claim 1, wherein the first data processing request comprises a request for data to be transmitted to the first packet data protocol remote sending device.

7. The method of claim 1, wherein the transmitting of the packet data protocol redirect request is performed without the first data processing request being permitted to reach the target computer server system.

8. The method of claim 1, further comprising: transmitting, when the packet data protocol redirect request is transmitted, a data request to a third-party server for data to be provided to the first remote packet data protocol sending device.

9. The method of claim 8, wherein the data request is for data to be included in an iframe.

10. The method of claim 1, wherein the packet data protocol redirect request includes an exploit-flagged-URL.

11. The method of claim 1, wherein the automated anomaly analyzer is a module running on a physical machine, and the first diagnostic instrumented module runs on the same physical machine.

12. The method of claim 1, wherein the first diagnostic instrumented module is running on a diagnostic module comprising a plurality of diagnostic instrumented modules, each diagnostic instrumented module provide virtualization of the request handling interface, wherein the method further comprises: receiving an indication of a processing load of the diagnostic module; assigning an anomaly severity representation to a third data processing request of the plurality of data processing requests according to an anomaly severity determined for the third data processing request; and determining whether to direct the third data processing request to the diagnostic module, according to the anomaly severity representation, wherein a determination of whether the third data processing request is sent to the diagnostic module or to the target computer server system is made in dependence on at least an anomaly severity and processing load of the diagnostic module.

13. The method of claim 12, wherein when the processing load of the diagnostic module is determined to exceed a threshold and when the anomaly severity representation indicates a low anomaly severity, then the third data processing request is not directed to the diagnostic module and is sent to the target computer server system.

14. The method of claim 12, wherein the diagnostic module is a server emulator, and each diagnostic instrumented module is a virtual server instance implementing virtualization of the request handling interface.

15. The method of claim 12, wherein each diagnostic instrumented module is a container instance implementing virtualization of the request handling interface.

16. The method of claim 12, wherein when the processing load of the diagnostic module is determined to be below the threshold and when the anomaly severity representation indicates the low anomaly severity, then the automated anomaly analyzer: (1) directs the third data processing request to a second diagnostic instrumented module configured to provide virtualization of the request handling interface, and (2) transmits, to a packet data protocol remote sending device that had transmitted the third data processing request, the packet data protocol redirect request for accessing the target computer server system.

17. The method of claim 1, further comprising: identifying as being non-anomalous, by the automated anomaly analyzer, a third data processing request of the plurality of data processing requests, the third data processing request having been transmitted by a second packet data protocol sending device other than the packet data protocol sending device; directing, by the automated anomaly analyzer, the third data processing request to a third diagnostic instrumented module configured to provide virtualization of the request handling interface, the third diagnostic instrumented module configured to provide an operating system environment different from the diagnostic instrumented module; and transmitting, by the automated anomaly analyzer, to the packet data protocol remote sending device, the packet data protocol redirect request for accessing the target computer server system.

18. The method of claim 1, further comprising: setting a level of diagnostic instrumentation to be provided by the first diagnostic instrumented module according to an anomaly severity determined, by the automated anomaly analyzer, for the first data processing request.

19. The method of claim 17, wherein the first diagnostic instrumented module is a container configured to virtualize the request handling interface, and the third diagnostic instrumented module is a container configured to virtualize the request handling interface running on a same physical device as the diagnostic instrumented module.

20. The method of claim 19, wherein the first virtual server and the second virtual server are managed by a QEMU hypervisor and are run on the same physical machine.

21. The method of claim 1, wherein the determined anomaly severity represents an Internet worm.

22. The method of claim 1, wherein the determined anomaly severity represents a computer virus.

23. The method of claim 1, wherein the determined anomaly severity represents an SQL injection attack.

24. The method of claim 1, wherein the first data processing request comprises a malicious attack.

25. The method of claim 1, wherein the first data processing request comprises a request for a webpage.

26. A method of protecting from packet data communication exploits, a target computer server system having a request handling interface that responds to a data processing request of a packet data communication, the method comprising:

receiving over a data communication network a plurality of data processing requests;

identifying as being non-anomalous, by an automated anomaly analyzer, a second data processing request of the plurality of data processing requests, wherein in response to the identifying as being non-anomalous, the automated anomaly analyzer transmits the second data processing request to the target computer server system;

identifying as being anomalous, by the automated anomaly analyzer, a first data processing request of the plurality of data processing requests, the first data processing request having been transmitted by a first packet data protocol sending device, wherein in response to the identifying as being anomalous, the automated anomaly analyzer:

(1) directs the first data processing request to a diagnostic instrumented module configured to provide virtualization of the request handling interface in processing the first data processing request and to determine an anomaly severity of the first data processing request, and (2) performs a second data processing comprising:

(a) transmitting, to the first packet data protocol remote sending device, a packet data protocol redirect request for accessing the target computer server system, (b) transmitting a response, to the first packet data protocol sending device, at a reduced content data byte per second rate compared with the rate of the response to the non-anomalous request, and (c) transmitting, to the first packet data protocol sending device, a response including invoking code requesting additional data from a network server resource other than the first packet data protocol sending device.

27. The method of claim 26, wherein the transmitting at the reduced content data byte per second rate comprises generating packets with fewer bits of content data.

28. The method of claim 26, further comprising: determining a packet data communication exploit suspect, based on processing by the first diagnostic instrumented module, of the first data processing request; and transmitting, in response to the determining, a detection signal indicating the first data processing request as being the packet data communication exploit suspect, wherein the transmitting of the packet data protocol redirect request at the reduced content data byte per second rate is performed without the first data processing request being permitted to reach the request handling interface.

29. The method of claim 26, wherein the first diagnostic instrumented module is a container virtualizing the request handling interface.

30. The method of claim 26, wherein the first diagnostic instrumented module is running on a diagnostic module comprising a plurality of diagnostic instrumented modules, each diagnostic instrumented module providing virtualization of the request handling interface, wherein the method further comprises: receiving an indication of a processing load of the diagnostic module; assigning an anomaly severity representation to a third data processing request of the plurality of data processing requests according to an anomaly severity determined for the third data processing request; and determining whether to direct the third data processing request to the diagnostic module, according to the anomaly severity representation, wherein a determination of whether the third data processing request is sent to the diagnostic module or to the target computer server system is in made in dependence on at least an anomaly severity and a processing load of the diagnostic module, such that when the processing load of the diagnostic module is determined to be below the threshold and when the anomaly severity representation indicates the low anomaly severity, then the automated anomaly analyzer: (1) directs the third data processing request to a second diagnostic instrumented module configured to provide virtualization of the request handling interface, and (2) transmits a response, to a packet data protocol remote sending device that had transmitted the third data processing request, at a reduced content data byte per second rate compared with a response to the non-anomalous request, and wherein when the processing load of the diagnostic module is determined to exceed a threshold and when the anomaly severity representation indicates a low anomaly severity, then the third data processing request is not directed to the diagnostic module and is sent to the target computer server system.

31. The method of claim 26, wherein the diagnostic module is a virtual server emulator, and each diagnostic instrumented module is a virtual server instance implementing virtualization of the request handling interface.

32. The method of claim 26, wherein each diagnostic instrumented module is a container instance implementing virtualization of the request handling interface.

33. The method of claim 26, further comprising: setting a level of diagnostic instrumentation to be provided by the diagnostic instrumented module according to an anomaly severity determined, by the automated anomaly analyzer, for the first data processing request.

34. The method of claim 26, wherein the determined anomaly severity represents an Internet worm.

35. The method of claim 26, wherein the determined maliciousness anomaly severity represents a computer virus.

36. The method of claim 26, wherein the determined anomaly severity represents an SQL injection attack.

37. The method of claim 26, wherein the first data processing request comprises a malicious attack.

38. The method of claim 26, wherein the first data processing request comprises a request for a webpage.

39. A method of protecting from packet data communication exploits, a target computer server system having a request handling interface that responds to a data processing request of a packet data communication, the method comprising:
receiving over a data communication network a plurality of data processing requests;
identifying as being non-anomalous, by an automated anomaly analyzer, a second data processing request of the plurality of data processing requests, wherein in response to the identifying as being non-anomalous, the automated anomaly analyzer transmits the second data processing request to the target computer server system;
identifying as being anomalous, by the automated anomaly analyzer, a first data processing request of the plurality of data processing requests, the first data processing request having been transmitted by a first packet data protocol sending device,
wherein in response to the identifying as being anomalous, the automated anomaly analyzer:
(1) directs the first data processing request to a diagnostic instrumented module configured to provide virtualization of the request handling interface in processing the first data processing request and to determine an anomaly severity of the first data processing request, and
(2) the second data processing further performing:
  (a) transmitting, to the first packet data protocol remote sending device, a packet data protocol redirect request for accessing the target computer server system,
  (b) transmitting, to the first packet data protocol sending device, a response to the first data processing request at a reduced content data byte per second rate compared with the rate of the response to the second data processing request, and
  (c) transmitting, to the first packet data protocol sending device, a response including invoking code requesting additional data from a network server resource other than the first packet data protocol sending device,
wherein a response to the non-anomalous request requesting a same data as the data requested by the first data processing request is free of the invoking code.

40. The method of claim 39, wherein the invoking code comprises reload request.

41. The method of claim 39, wherein the invoking code comprises at least one of a Javascript reload request and a Javascript docwrite request.

42. The method of claim 39, further comprising: determining a packet data communication exploit suspect, based on processing by the first diagnostic instrumented module, of the first data processing request; and transmitting, in response to the determining, a detection signal indicating the first data processing request as being the packet data communication exploit suspect, wherein the transmitting of the packet data protocol redirect request at the reduced content data byte per second rate is performed without the first data processing request being permitted to reach the request handling interface.

43. The method of claim 39, wherein the first diagnostic instrumented module is a container virtualizing the request handling interface.

44. The method of claim 39, wherein the first diagnostic instrumented module is running on a diagnostic module comprising a plurality of diagnostic instrumented modules, each diagnostic instrumented module providing virtualization of the request handling interface, wherein the method further comprises: receiving an indication of a processing load of the diagnostic module; assigning an anomaly severity representation to a third data processing request of the plurality of data processing requests according to an anomaly severity determined for the third data processing request; and determining whether to direct the third data processing request to the diagnostic module, according to the anomaly severity representation, wherein a determination of whether the third data processing request is sent to the diagnostic module or to the target computer server system is in made in dependence on at least an anomaly severity and a processing load of the diagnostic module, such that when the processing load of the diagnostic module is determined to be below the threshold and when the anomaly severity representation indicates the low anomaly severity, then the automated anomaly analyzer: (1) directs the third data processing request to a second diagnostic instrumented module configured to provide virtualization of the request handling interface, and (2) transmits, to the first packet data protocol sending device, a response including the invoking code requesting additional data from a network server resource other than the first packet data protocol sending device, and wherein when the processing load of the diagnostic module is determined to exceed a threshold and when the anomaly severity representation indicates a low anomaly severity, then the third data processing request is not directed to the diagnostic module and is sent to the target computer server system.

45. The method of claim 39, wherein the diagnostic module is a virtual server emulator, and each diagnostic instrumented module is a virtual server instance implementing virtualization of the request handling interface.

46. The method of claim 39, wherein each diagnostic instrumented module is a container instance implementing virtualization of the request handling interface.

47. The method of claim 39, further comprising: setting a level of diagnostic instrumentation to be provided by the diagnostic instrumented module according to an anomaly severity determined, by the automated anomaly analyzer, for the first data processing request.

48. The method of claim 39, wherein the determined anomaly severity represents an Internet worm.

49. The method of claim 39, wherein the determined maliciousness anomaly severity represents a computer virus.

50. The method of claim 39, wherein the determined anomaly severity represents an SQL injection attack.

51. The method of claim 39, wherein the first data processing request comprises a malicious attack.

52. The method of claim 39, wherein the first data processing request comprises a request for a webpage.

53. The method of claim 1, wherein the automated anomaly analyzer is configured further to determine a first suspect in a resource exhaustion attack against the target computer server, the method further comprising: monitoring a first plurality of data processing requests received over the data communication network from a first remote sender; identifying a first transition, dependent on a first sequence of data processing requests comprising a first data processing request of the first plurality of data processing requests and a second data processing request of the first plurality of data processing requests; determining a first anomaly profile for the remote sender based on a first anomaly representation assigned to the first transition and a second anomaly representation determined for the first remote sender; determining based on the first anomaly profile, that the first remote sender is the first suspect in the resource exhaustion attack; and based on the determining of the first suspect, taking action with the automated processor of at least one of: communicating a message dependent on the determining, and modifying at least one data processing request of the first plurality of data processing requests.

54. The method of claim 53, further comprising identifying, as a second transition, a second sequence of data processing requests of the first plurality of data processing requests for the first remote sender, wherein the second anomaly representation is an anomaly representation assigned to the second transition.

55. The method of claim 53, wherein the resource exhaustion attack is a distributed denial of service attack.

56. The method of claim 53, wherein the first anomaly representation and the second anomaly representation are anomaly values retrieved from a transition anomaly matrix in dependence on the first and second transitions, respectively, and wherein the first anomaly profile for the first remote sender is determined by combining the first anomaly representation and the second anomaly representation.

57. The method of claim 53, wherein the taking of the action is performed only after a resource use determination that at least one resource of target computer server is at least one of exhausted or substantially exhausted.

58. The method of claim 53, further comprising: monitoring a period of time between a time of the first transition and a time of the determination of the second anomaly representation, wherein the taking of the action is performed only when the period of time is shorter than a predetermined period of time.

59. The method of claim 53, further comprising: comparing the first anomaly profile with a first threshold, wherein the first remote sender is determined as the first suspect only when the first anomaly profile is greater than the first threshold.

60. The method of claim 59, further comprising: after the first suspect is determined, when at least one resource of the target computer server is at least one of exhausted or substantially exhausted, adjusting the first threshold; and determining a second suspect with a second anomaly profile by comparing the second anomaly profile with the adjusted threshold.

61. The method of claim 53, further comprising assigning the second anomaly representation based on an overlapping range in packets received from the first remote sender.

62. The method of claim 53, wherein the anomaly analyzer is positioned at a web server, the data communication network is the Internet, and each data processing request of the first plurality of data processing requests comprises a request for a webpage.

63. The method of claim 53, wherein the taking the action comprises sending a signal to diminish a response to data processing requests of the first suspect.

64. The method of claim 53, further comprising: obtaining a plurality of sampling data processing requests received over the data communication network from a plurality of remote senders; identifying, as a first sampling transition, a first sequence of data processing requests comprising a first sampling data processing request of the plurality of sampling data processing requests and a second sampling data processing request of the plurality of data processing requests; identifying, as a second sampling transition, a second sequence of data processing requests comprising the second data processing request and a third data processing request of the plurality of sampling data processing requests; and assigning the first anomaly representation to the first sampling transition as a function of a frequency of the first sampling transition, and assigning the second anomaly representation to the second transition, as a function of a frequency of the second sampling transition.

65. The method of claim 64, wherein the frequency of the first transition and the frequency of the second transition are calculated based on the frequency over a period of time of the first sampling transition and the second sampling transition with respect to a totality of the plurality of sampling data processing requests obtained.

66. The method of claim 53, further comprising: monitoring a first period of time between a time of the first transition and a time of the determination of the second anomaly representation; and degrading a first value assigned according to a length of the first period of time, the degrading performed according to the second anomaly representation such that an anomaly representation indicating a more anomalous representation results in a degradation of the first value smaller than degradation of the first value according to an anomaly representation indicating a less anomalous representation, wherein the taking of the action is performed only when the first value is greater than zero or a threshold time value.

67. A system configured to protect a target computer server system against packet data communication exploits, the target computer server system having a request handling interface that responds to a data processing request of a packet data communication received over a data communication network from a first packet data protocol sending device, the system comprising:
  a network interface configured to receive over the data communication network a plurality of data processing requests;
  an automated anomaly analyzer configured to identify as being anomalous a first data processing request of the plurality of data processing requests, the first data processing request having been transmitted by the first packet data protocol sending device; and
  the automated anomaly analyzer configured to identify as being non-anomalous, a second data processing request of the plurality of data processing requests and, in response to the identifying the second data processing request as being non-anomalous, the automated anomaly analyzer transmits the second data processing request to the target computer server system for preparing a response to the second data processing request, wherein in response to the identifying the first data processing request as being anomalous, the automated anomaly analyzer:

(1) directs the first data processing request to a first diagnostic instrumenter configured to provide virtualization of the request handling interface in processing the first data processing request, and (2) performs a second processing comprising:
   (a) transmitting, to the first packet data protocol remote sending device, a packet data protocol redirect request for accessing the target computer server system,
   (b) transmitting, to the first packet data protocol sending device, a response to the first data processing request at a reduced content data byte per second rate compared with the rate of the response to the second data processing request, and
   (c) transmitting, to the first packet data protocol sending device, a response including invoking code requesting additional data from a network server resource other than the first packet data protocol sending device, wherein the response to the second data processing request requesting a same data as the data requested by the first data processing request is free of the invoking code.

68. The system of claim 67, further comprising the first diagnostic instrumenter.

69. The system of claim 68, wherein the first diagnostic instrumenter is configured to determine an anomaly severity of the first data processing request, and to determine that the first data processing request is a packet data communication exploit suspect, based on the anomaly severity.

70. The system of claim 68, wherein the automated anomaly analyzer runs on a physical machine, and the first diagnostic instrumenter runs on the same physical machine.

71. The system of claim 67, wherein the transmitting of the packet data protocol redirect request and the second processing are performed without the first data processing request being permitted to reach the target computer server system.

* * * * *